(12) United States Patent
Sun et al.

(10) Patent No.: US 9,677,738 B2
(45) Date of Patent: Jun. 13, 2017

(54) OPTICAL DEVICE AND SYSTEM FOR SOLID-STATE LIGHTING

(71) Applicants: Jie Sun, Ottawa (CA); Christopher Hart, Greely (CA); Stephen Naor, Ottawa (CA)

(72) Inventors: Jie Sun, Ottawa (CA); Christopher Hart, Greely (CA); Stephen Naor, Ottawa (CA)

(73) Assignee: 1947796 Ontario Inc., Toronto, Ontario (CA)

( * ) Notice: Subject to any disclaimer, the term of this patent is extended or adjusted under 35 U.S.C. 154(b) by 287 days.

(21) Appl. No.: 14/211,124

(22) Filed: Mar. 14, 2014

(65) Prior Publication Data

US 2014/0268802 A1 Sep. 18, 2014

Related U.S. Application Data

(60) Provisional application No. 61/786,743, filed on Mar. 15, 2013.

(51) Int. Cl.
*F21V 5/00* (2015.01)
*F21V 3/00* (2015.01)
(Continued)

(52) U.S. Cl.
CPC ............... *F21V 5/04* (2013.01); *F21K 9/232* (2016.08); *F21K 9/60* (2016.08); *F21V 29/773* (2015.01);
(Continued)

(58) Field of Classification Search
CPC .. G02B 3/04; G02B 3/06; G02B 2006/12102; F21K 9/135; F21K 9/52; F21K 9/1355;
(Continued)

(56) References Cited

U.S. PATENT DOCUMENTS

| | | | | |
|---|---|---|---|---|
| 1,495,521 A | * | 5/1924 | Kopp | B64F 1/18 362/334 |
| 3,493,157 A | | 2/1970 | Burdorf et al. | |

(Continued)

FOREIGN PATENT DOCUMENTS

| | | |
|---|---|---|
| WO | 2010144572 A2 | 12/2010 |
| WO | 2010144572 A3 | 3/2011 |

*Primary Examiner* — Renee Chavez
*Assistant Examiner* — Erin Kryukova
(74) *Attorney, Agent, or Firm* — Teitebaum & MacLean; Neil Teitelbaum; Doug MacLean

(57) ABSTRACT

An optical device for transforming an input light distribution from an LED light source to provide an omni-directional output light distribution for solid-state lighting is disclosed. The optical device has a conical form, comprising first and second coaxial cones of different refractive index, defined by coaxial inner and outer cone surfaces, which converge from a cone base to a rounded tip at the apex. Preferably, each of the inner and outer cone surfaces comprises a plurality of conical facets defining a grating structure. The inner cone, i.e. air cavity, is directly coupled to an LED emitter area. Cone angles and spacings of conical facets, defining inner and outer gratings, are tailored to reshape a predetermined input light distribution. Apertures assist in heat dissipation. A lightweight, compact device with high transmission efficiency can be manufactured at low cost by one-step injection molding from an optical-grade polymer, such as PMMA.

18 Claims, 18 Drawing Sheets

(51) Int. Cl.
*F21V 5/04* (2006.01)
*F21V 29/83* (2015.01)
*F21V 29/77* (2015.01)
*F21K 9/232* (2016.01)
*F21K 9/60* (2016.01)
*F21Y 115/10* (2016.01)

(52) U.S. Cl.
CPC ............... *F21V 29/83* (2015.01); *F21V 3/00* (2013.01); *F21Y 2115/10* (2016.08); *Y02B 20/30* (2013.01)

(58) Field of Classification Search
CPC .......... F21K 9/232; F21V 5/046; F21V 5/005; F21V 5/02; F21V 5/04; F21Y 2101/02
USPC ......................................................... 362/244
See application file for complete search history.

(56) References Cited

U.S. PATENT DOCUMENTS

| | | | |
|---|---|---|---|
| 4,767,172 A | 8/1988 | Nichols et al. | |
| 4,866,580 A | 9/1989 | Blackerby | |
| 5,001,609 A | 3/1991 | Gardner et al. | |
| 5,335,158 A | 8/1994 | Kaplan et al. | |
| 5,404,869 A * | 4/1995 | Parkyn, Jr. | G02B 19/0028 126/698 |
| 5,577,493 A | 11/1996 | Parkyn, Jr. et al. | |
| 5,608,290 A * | 3/1997 | Hutchisson | B60Q 7/00 315/185 R |
| 5,613,769 A | 3/1997 | Parkyn, Jr. et al. | |
| 5,757,557 A | 5/1998 | Medvedev et al. | |
| 6,547,423 B2 | 4/2003 | Marshall et al. | |
| 6,646,813 B2 | 11/2003 | Falicoff et al. | |
| 6,755,556 B2 * | 6/2004 | Gasquet | F21S 48/2212 362/328 |
| 7,006,306 B2 | 2/2006 | Falicoff et al. | |
| 7,021,792 B2 | 4/2006 | Lin | |
| 7,329,029 B2 | 2/2008 | Chaves et al. | |
| 7,400,439 B2 | 7/2008 | Holman | |
| 7,524,098 B2 | 4/2009 | Vennetier et al. | |
| 7,524,099 B2 | 4/2009 | Moon | |
| 7,652,300 B2 | 1/2010 | Kan | |
| 7,699,504 B2 | 4/2010 | Sun et al. | |
| 7,753,561 B2 | 7/2010 | Chaves et al. | |
| 7,758,208 B2 | 7/2010 | Bailey | |
| 7,878,689 B2 | 2/2011 | Sun et al. | |
| 8,033,706 B1 | 10/2011 | Kelly et al. | |
| 8,038,319 B2 | 10/2011 | Bailey | |
| 8,075,147 B2 | 12/2011 | Chaves et al. | |
| 8,125,127 B2 | 2/2012 | Mo et al. | |
| 8,152,318 B2 | 4/2012 | Richardson | |
| 8,215,802 B2 | 7/2012 | Bailey | |
| 8,292,468 B2 | 10/2012 | Narendran et al. | |
| 9,494,297 B1 * | 11/2016 | Nagengast | F21V 13/04 |
| 2002/0149924 A1 | 10/2002 | Falicoff et al. | |
| 2004/0004836 A1 * | 1/2004 | Dubuc | B64F 1/20 362/249.01 |
| 2004/0228131 A1 | 11/2004 | Minano et al. | |
| 2005/0007257 A1 | 1/2005 | Rast | |
| 2005/0024744 A1 * | 2/2005 | Falicoff | G02B 3/04 359/737 |
| 2008/0123349 A1 | 5/2008 | Chaves et al. | |
| 2009/0067179 A1 | 3/2009 | Chaves et al. | |
| 2009/0212698 A1 | 8/2009 | Bailey | |
| 2009/0225529 A1 | 9/2009 | Falicoff et al. | |
| 2010/0073927 A1 | 3/2010 | Lewin et al. | |
| 2010/0165637 A1 | 7/2010 | Premysler | |
| 2010/0213836 A1 | 8/2010 | Liao et al. | |
| 2011/0051394 A1 | 3/2011 | Bailey | |
| 2011/0095686 A1 | 4/2011 | Falicoff et al. | |
| 2011/0110095 A1 | 5/2011 | Li et al. | |
| 2011/0140587 A1 * | 6/2011 | Lee | F21K 9/135 313/46 |
| 2011/0163683 A1 | 7/2011 | Steele et al. | |
| 2011/0273900 A1 * | 11/2011 | Li | F21K 9/135 362/555 |
| 2011/0286200 A1 | 11/2011 | Iimura et al. | |
| 2012/0020082 A1 | 1/2012 | Shinohara | |
| 2012/0080699 A1 | 4/2012 | Chowdhury et al. | |
| 2012/0081880 A1 | 4/2012 | Narendran et al. | |
| 2012/0106190 A1 | 5/2012 | Ben-Levy | |
| 2013/0208488 A1 | 8/2013 | Lin | F21K 9/50 362/311.02 |
| 2014/0062713 A1 * | 3/2014 | Skertich, Jr. | F21V 5/04 340/815.45 |

* cited by examiner

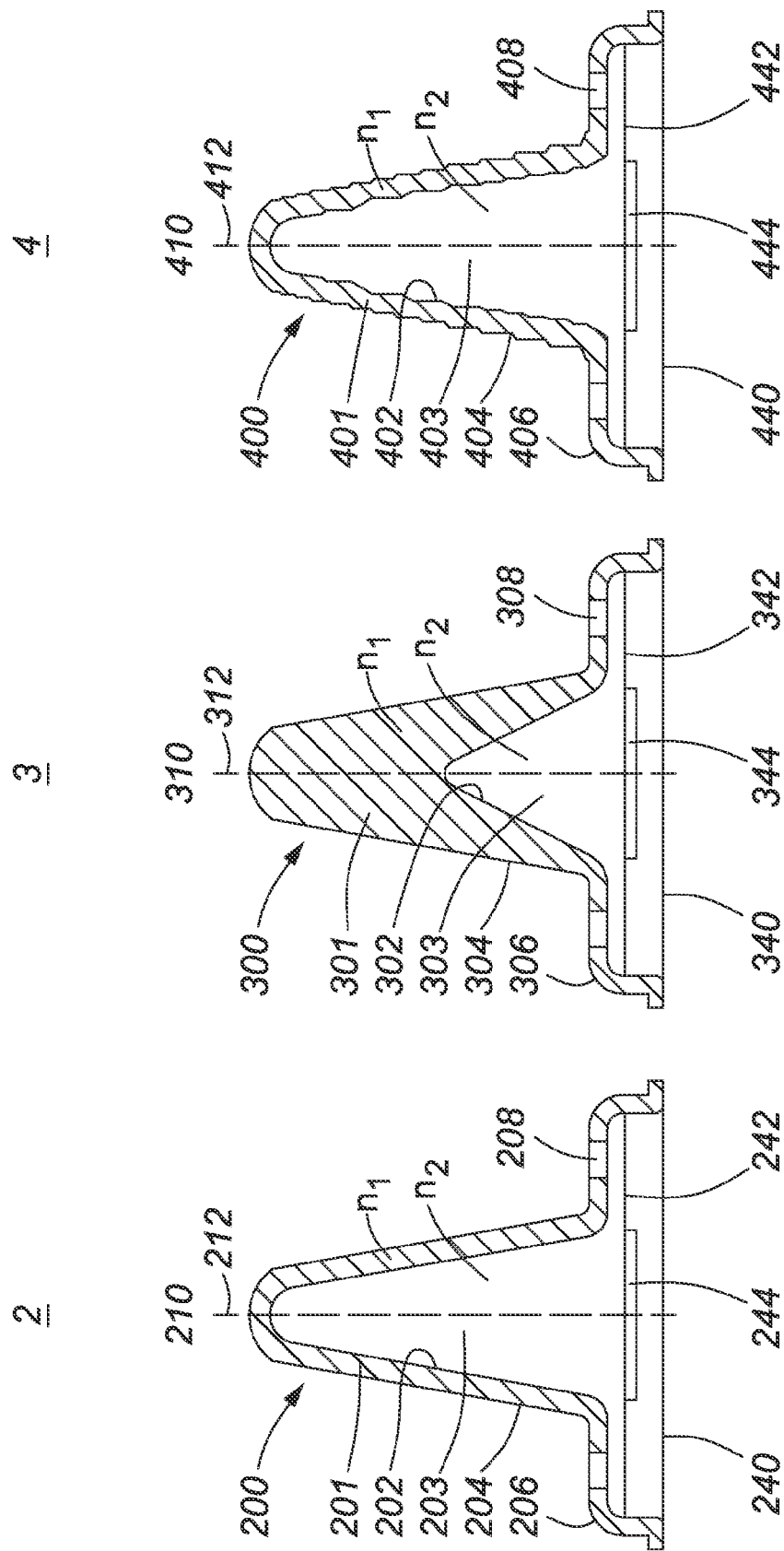

OPTICAL DEVICE AND SYSTEM FOR SOLID-STATE LIGHTING

CROSS-REFERENCE TO RELATED APPLICATIONS

This application claims priority from U.S. Provisional Application No. 61/786,743, of the same title, filed Mar. 15, 2013, which is incorporated herein by reference in its entirety.

TECHNICAL FIELD

The present invention relates to solid-state lighting, and particularly to optical systems comprising a solid-state light-emitting device (LED) and an optical device, such as a light guide or light pipe, for providing a desired light distribution, for example, an omni-directional light distribution suitable for solid-state lighting applications.

BACKGROUND ART

In line with a global trend towards improved energy efficiency and energy conservation, the lighting industry is moving from incandescent lighting to alternative, more energy-efficient light sources. Solid-state light-emitting devices (LEDs), such as light-emitting diodes, have evolved rapidly in recent years and are now available with high brightness and suitable color rendering indices (CRI) for replacement of incandescent lamps, while providing improved energy efficiency and operational lifetime. LEDs are available for solid-state lighting (SSL) applications for both domestic and commercial use. The compact size of LEDs allows for lamps of different form factors from traditional incandescent lamps and fluorescent light fixtures. However, there is ongoing demand for replacements for conventional incandescent bulbs of standard configurations, i.e. for existing light fixtures.

For example, one of the most commonly used bulbs is the A19 bulb configuration that provides a generally omni-directional light distribution. This is the form of a conventional pear-shaped incandescent light bulb with a tungsten filament. Other common configurations are candelabra bulbs, which produce a narrower distribution, and parabolic reflector bulbs, which produce a more collimated beam for spotlights or down lighting.

LED light sources may comprise a die with a single light-emitting element, or an array of multiple light-emitting elements, with or without a hemispherical dome lens. Currently, white light LED light sources for solid-state lighting typically comprise a substrate carrying a planar array of a plurality of LED emitters covered by a layer of a phosphor material to provide light emission of a desired CRI and spectral distribution over the visible wavelength range. The light-emitting area may, for example, be a flat circular area, about 10 mm in diameter, comprising many light emitters, carried on a rectangular chip or substrate. Light emitted from the flat surface of the LED light source is therefore emitted over an angular distribution of up to 180°, i.e. in a hemispherical distribution ($2\pi$ steradian). This is significantly different from that of the filament of an incandescent light bulb, which emits over a spherical, 360° angular distribution ($4\pi$ steradian).

For solid-state light sources designed to replace conventional incandescent light bulbs, it is desirable to increase the angular distribution of light emitted from the surface of an LED light source to provide an omni-directional distribution closer to that of an incandescent bulb. Thus, typically, one or more optical elements, such as lenses, collimators, light guides or light pipes are used to extract and distribute light emission from the surface of an LED light source.

Where it is desired to provide an LED light source to replace a conventional incandescent light bulb, such as a standard bulb or candelabra bulb, it is known to use a light pipe or light guide to transport light some distance from the LED surface, and then distribute the light into a more omni-directional distribution, e.g. by a process of reflection and/or refraction and/or total internal reflection (TIR) to emulate the 360° angular distribution of a filament of a conventional incandescent light bulb. Such a light guide may be referred to as a "virtual filament" or "solid-state filament".

Numerous designs have been proposed for light pipes or light-guiding devices for transporting light from the LED light source with low loss of luminous intensity.

Light may be collimated or concentrated into a light guide, e.g. using a conical or tulip shaped collimator (see for example, U.S. Pat. No. 6,547,423 or US Patent Publication No. US2011/0051394). Light is transmitted or propagated along a length of a light pipe or a light guide by means of total internal reflection (TIR). Light exits from a surface or surfaces of the light pipe by reflection, refraction or scattering. The geometry of the exit surfaces of the light guide determines the angular distribution of light emitted. The light guide may be made from transparent optical-grade glass or polymer material, for example. Losses can occur from reflection and refraction at multiple interfaces, and losses may also be dependent on the thickness and optical properties of the material of the light guide, e.g. absorption losses. The following references provide a few examples of light guides of this type:

U.S. Pat. No. 7,753,561 and U.S. Pat. No. 7,329,029 to Chaves et al., both entitled "Optical Device for LED Lamp" and related patents cited therein, disclose elongated light guides, which comprise a transfer section and an ejector section. The transfer section is referred to as a compound elliptical concentrator, and the ejector section comprises reflection and refraction surfaces to produce a more spherical distribution of light, e.g. for conventional light bulb configurations. These references also disclose use of a TIR lens in combination with a light guide to further shape the light distribution.

U.S. Pat. No. 7,006,306 to Falicoff et al., entitled "Circumferentially emitting luminaires and lens-elements formed by transverse-axis profile-sweeps" discloses lens elements or light guides of various configurations, including some with a generally conical or cylindrical form, having inner and outer surfaces with multiple multi-directional facets to form a flattened, narrow output beam around 360° (similar to the sweep of a lighthouse beam), e.g. for illuminating signage.

U.S. Pat. No. 8,215,802 to Bailey, entitled "Multiple Tier Omni-directional Solid-State Emission Source" discloses a light guide reported to have a high optical transmission. The optic provides for collimation of light from an LED light source at the bottom of the optic, delivery of light to a position at a distance from the source, and at the top, a complex tiered structure with reflection and refraction surfaces to provide an omni-directional light distribution.

Although some of the light guides disclosed in these references provide for omni-directional light distributions over a very wide angle, the geometry of these structures is complex. The multiple facets with multi-directional forward and backward facing surfaces make these structures complex and expensive to design and manufacture, requiring complex mold tools, multistep molding and finishing processes to produce the product. Complex shapes with multiple opposing surfaces may require multi-part molds with seams, for example, that necessitate finishing or polishing of optical surfaces of the light guide after the molding process, which adds to manufacturing costs.

Apart from design and manufacturing issues, these complexly-shaped light guides have multiple reflective/refractive surfaces or facets that intersect at acute angles. The sharp angles, between opposing reflective surfaces can generate significant discontinuities or undulations in the angular distribution of the light intensity. These discontinuities may be apparent as artifacts in the light distribution, such as brighter and darker fringe patterns that are visible to the human eye and/or which may be unacceptable for applications requiring uniform or even lighting. Thus, although many light guides, light pipes, and non-imaging optics have been proposed to provide a wider angular distribution from an LED light source, many do not meet the requirements established by existing lighting standards and/or are complex and expensive to manufacture.

Another issue is that in the above referenced structures, the light guide typically comprises a transparent optical grade polymer material, such as PMMA (polymethyl methacrylate) that can degrade during extended use at high temperatures. The light guide is positioned over the light-emitting surface, close to, or in contact with, the LED chip. Operating temperatures of the LED emitter surface may typically rise to 100° C. or more. Therefore, the polymer material is exposed to elevated temperatures that contribute to aging or premature breakdown of the material, which over time can degrade the optical properties, such as the refractive index, and decrease the useful operational life span. Existing light guides do not effectively address these issues of thermal stresses or thermal degradation.

Thus, there is a need for improved or alternative optical elements or light guides that address one or more issues of cost, manufacturability, low transmission efficiency, limited luminous efficiency and uniformity, and poor thermal management.

In particular, there is a need for improved or alternative optical systems and devices for solid-state lighting systems comprising LEDs, which can replace conventional incandescent light bulbs, e.g. for use in SSL applications requiring light sources which have an omni-directional light distribution.

SUMMARY OF INVENTION

The present invention seeks to overcome or mitigate one or more of the above-mentioned problems relating to light guides for solid-state lighting systems, or at least provide an alternative.

One aspect of the invention provides an optical device for transforming (i.e. reshaping) an input light distribution from a solid-state light-emitting device (LED) to provide an omni-directional output light distribution, the optical device comprising: a conical body of an optically-transparent material comprising an inner cone surface and an outer cone surface; the inner and outer cone surfaces converging coaxially from a base of the conical body to a rounded tip at an apex of the conical body, and defining an outer cone of the optically-transparent material, having a first refractive index $n_1$, and an inner cone comprising a cavity containing a transparent optical medium of a second refractive index $n_2$, wherein $n_1 > n_2$; the inner cone having a diameter (d) at the base of the conical body for coupling to a light-emitting surface of the LED light source and receiving therefrom a predetermined input light distribution; and the coaxial inner and outer cone surfaces being defined respectively by an inner cone angle $\Phi$ defining the coaxial inner cone surface and an outer cone angle $\Theta$ defining the outer cone surface, each of $\Phi$ and $\Theta$ being less than 90° and at least one of the inner cone surface and the outer cone surface further comprising a grating structure comprising a plurality of conical facets, said plurality of conical facets tapering towards the apex of the conical body, and cone angles of the conical facets being configured to reshape the predetermined input light distribution from the LED light source and generate an omni-directional output light distribution.

Thus, the optical device takes the form of a cone optic or light guide, i.e. having a conical body defining inner and outer cones of different refractive index. In simplified form, the inner and outer cone surfaces define respectively inner and outer cone angles $\Phi$ and $\Theta$, and at the apex of the cone body, the outer and inner cone surfaces have an outer height H and inner height h respectively, the inner and outer cone surfaces extended to form a rounded tip of outer radius R and inner radius r respectively at the apex of the cone body. The parameters defining the form of the inner and outer cone surfaces are selected to provide the predetermined angular distribution for a given input light distribution from the LED light source.

In a preferred embodiment, both the inner and outer cone surfaces comprise a plurality of facets, which define an inner grating structure and an outer grating structure respectively, which further transforms or reshapes the input light distribution.

That is, the inner cone surface comprises an inner grating structure comprising a first plurality of conical facets; the outer cone surface comprising an outer grating structure comprising a second plurality of conical facets, with said first and second plurality of conical facets tapering towards the apex of the conical body. Cone angles and spacings of the first and second plurality of conical facets are configured to reshape the predetermined input light distribution from the LED light source and generate an omni-directional output light distribution.

For example, each grating structure comprises an arrangement of alternating cylindrical (spacing) facets and conical facets, diminishing in diameter towards the apex of the conical body. The grating elements of the inner and outer cone surfaces may be arranged as a plurality of concentric annular surfaces diminishing in diameter towards the apex.

The spacings of the conical facets, inner angles $\theta_{inner}$ and $\phi_{inner}$, and outer angles $\theta_{outer}$ and $\phi_{outer}$, of each conical facet of the grating structure define the grating structure to provide a desired omni-directional output light distribution, from a predetermined input light distribution, i.e. tailored to a specific LED.

The grating structure may comprise a uniform or periodic arrangement of a plurality of alternating conical facet surfaces and cylindrical (or substantially cylindrical or only slightly tapered) facet surfaces. Grating structures defined by the inner and outer cone surfaces differ in angles and spacings, and the inner and outer facets co-operate to provide a predetermined light distribution, based on a given input light distribution received from the LED light source. In some embodiments, each facet, cone angle, and facet spacing (i.e. a vertical or axial spacing) may be individually configured to provide an omni-directional light distribution, based on a predetermined light distribution received from a particular LED light source.

In some embodiments, the grating structure may comprise several groups or families of facets. For example, the grating may comprise a first group or series of uniformly spaced facets of similar cone angles, and one or more other groups, having another series of one or more facets with different vertical spacings and cone angles. The structure of the gratings may alternatively comprise alternating conical facets with different cone angles, i.e. cylindrical facets are replaced with conical facets that are also tapered slightly towards the apex. For example, to facilitate mold release, the cylindrical spacing facets may be slightly tapered by ≤1° toward the apex.

The conical body comprises an optically-transparent material of the second refractive $n_2$ forming the outer cone and defining said inner and outer cone surfaces, and the inner cone may comprise an air-filled cavity having a refractive index $n_1=1$. The optically-transparent material has a refractive index $n_2$ greater than air, and preferably greater than 1.4, e.g. glass or PMMA.

In preferred embodiments, at the base of the conical body, the inner and outer cone surfaces extend radially outwards to form a base region of the optical device.

The base region is configured to extend over a substrate of the LED light source and comprises a plurality of ventilation apertures. For example, the base region comprises a flange extending around the base of the cone body, said flange providing a support surface for mounting to a substrate of the LED light source, and wherein the ventilation apertures are arranged around the flange. The flange may have an attachment surface that can be secured adhesively, or it may provide a clip or other resilient attachment means.

An optical device may be provided for generating a light distribution over a solid angle >140°, and preferably over a solid angle greater than one hemisphere, from an LED light source having a planar or substantially flat light-emitting surface.

The optical device may be fabricated from optically-transparent material comprising optical-grade PMMA, optical-grade glass or other optical-grade material, preferably providing transmission efficiency greater than 90% over the visible spectral range emitted by the LED light source.

In preferred embodiments, all surfaces of the optical device extend coaxially towards the apex of the cone, either parallel to the cone axis or converging towards the cone apex, i.e. concentric surfaces with diminishing diameter towards the tip. Thus, advantageously, the optical device is configured for fabrication using a relatively simple mold tool, by a process comprising one-step injection molding from the optically-transparent material.

The optical device is preferably compact and light weight. For example, in one embodiment for an A19-type light bulb, the cone optic has a base diameter of 25 mm or less, and an overall height of 25 mm or less, and the outer cone surface has an axial height of 20 mm or less. In preferred embodiments, body defined between the inner and outer cone surfaces is relatively thin and has a substantially uniform thickness from the base to the apex, e.g. 1 mm-2 mm thickness including facets or grating structures. This facilitates molding and requires less material for fabrication. It is preferably lightweight, e.g. having a weight of less than 2 g, and preferably less than 1.5 g.

The relatively thin body, and ventilation holes assist in thermal dissipation, and help to avoid hot spots and heat stresses, which can contribute to thermal degradation during prolonged operation.

Another aspect of the invention provides a solid-state lighting system comprising an assembly of a solid-state LED and an optical device, as defined above.

For example, the solid-state light-emitting device comprises a substrate and a substantially planar light-emitting surface of a diameter d. The diameter of the inner cone at the cone base is sized to extend over the diameter d of the light-emitting surface and collect light therefrom. The LED light source is mounted on a thermal conductive support, in thermal contact therewith, and the optical device is mounted thereon, aligned over the light-emitting surface of the LED light source; the light source and optical device being positions to allow for air flow through ventilation apertures in the base region of the optical device, to assist in heat dissipation from the LED light source. In preferred embodiments, the system is configured as a standard incandescent light bulb replacement, e.g. comprising a base having a heat sink and a mounting surface, and comprising a plastic or glass globe or other transparent or translucent envelope or covering. In some embodiments, the dimensions of the cone-optic light pipe and the thermally-conductive support are selected to place the cone apex substantially at the centre of the light bulb globe, and provide an angular light distribution over an angular distribution of >140°. However, the thickness, geometry and refractive index of the part-spherical glass or plastic envelope, generally referred to as a "globe", that is conventionally part of a light bulb, further influences or reshapes the output light distribution. Thus, in other embodiments, the apex of the cone-optic light pipe may be otherwise positioned relative to the centre of the globe to optimize the omni-directional output light distribution.

Thus, optical devices and systems according to the present invention mitigate one of more disadvantages of known optical elements and light guides for generating omni-directional light distributions from LED light sources for solid-state lighting applications.

The foregoing and other objects, features, aspects and advantages of the present invention will become more apparent from the following detailed description, taken in conjunction with the accompanying drawings, of embodiments of the invention, which description is by way of example only.

BRIEF DESCRIPTION OF THE DRAWINGS

Embodiments of the invention will now be described, by way of example, with reference to the following drawings:

FIG. 2 shows a schematic cross-sectional diagram of a light guide according to a first embodiment of the present invention;

FIG. 3 shows a schematic cross-sectional diagram of a light guide according to a second embodiment of the present invention;

FIG. 4 shows a schematic cross-sectional diagram of a light guide according to a third embodiment of the present invention;

DETAILED DESCRIPTION OF THE EMBODIMENTS

Figure 1:
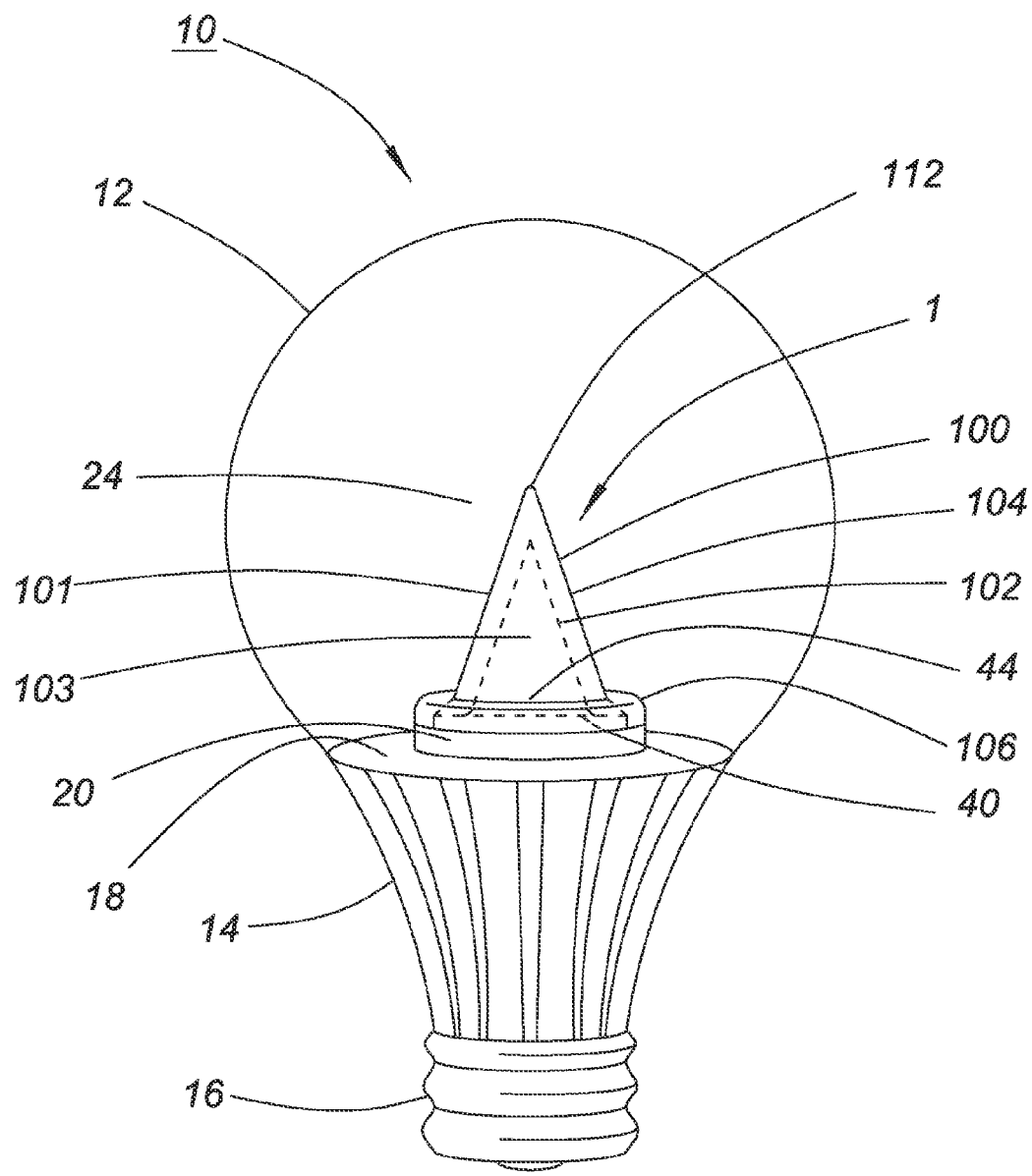
FIG. 1 shows schematically a system for solid state lighting comprising an assembly of a solid-state light-emitting device (LED) and a light guide according to an embodiment of the present invention, taking the form of an A19-type light bulb.

A solid-state light source system in the form of a light bulb 10, comprising an assembly of an LED light source 40 and an optical device 1 according to an embodiment of the present invention, is shown schematically in FIG. 1. The optical device 1 comprises a body 100 of a transparent optical-grade material in the form of a hollow cone with a first (inner) cone surface 102 and a second (outer) cone surface 104. The inner cone surface 102 and outer cone surface 104 converge coaxially from a base 106 of the body 100 to a rounded tip at the apex 112 of the body 100, thus, defining coaxial outer and inner cones 101 and 103. The outer cone 101 is formed of the transparent optical material of a first refractive index $n_1$, and the inner cone 103 comprises a cavity containing air or a second optical transparent medium of refractive index $n_2$. The refractive index $n_1$ is greater than $n_2$. The inner cone cavity 103 is placed over the light-emitting surface 44 of a solid-state light source 40. As will be described in more detail with reference to the following Figures, the inner and outer cone surfaces 102 and 104 of the optical device 1 are coaxial and structured to act as a light guide to transform, i.e. reshape, a predetermined input light distribution received from the LED light source 40 to produce an omni-directional output light distribution, similar to that of a conventional incandescent light bulb.

For example, the LED light source 40 may be an LED array, having a planar emitter surface 44, having a diameter d, e.g. 10 mm, and providing a directional output that is defined by a super Gaussian function, i.e. a relatively narrow distribution with strong emission in an axial direction, perpendicular to the LED emitter surface and weaker emission in lateral directions. This narrow angular distribution requires transforming or reshaping over a wider angular distribution to produce a suitable omni-directional output light distribution for a light bulb.

In the following description, the optical element or device 1 of this embodiment and optical devices 2, 3, and 4 of other embodiments, illustrated in FIGS. 2, 3 and 4 respectively, may alternatively be referred to as a cone-optic light pipe or light guide, or simply as a "cone optic". To facilitate comparison, corresponding parts of the optical devices 1, 2, 3, and 4, shown in FIGS. 1, 2, 3 and 4 respectively, are labelled with the same reference numerals incremented by 100.

By way of example, the light bulb 10, represented schematically in FIG. 1, is of the commonly used A19 type[1], which is generally pear-shaped, having a part-spherical glass envelope or "globe" 12 of a transparent or translucent material, and a tapered lower portion or neck 14 extending to a standard base 16. As shown, the tapered lower portion 14 comprises aluminum heat sink fins extending to the base 16, e.g. a standard Edison screw base. A pedestal 20, also comprising aluminum, extends from the top surface 18 of the lower portion 14, in thermal contact therewith, and provides a mounting surface supporting the LED light source 40. The LED light source 40 comprises a substrate providing, for example, a circular emitter area 44 comprising a planar array of a plurality of LED emitters and an overlying layer of a phosphor material to provide a visible light over a desired spectral range and having a desired CRI. The light pipe 1 is positioned over the planar light-emitting surface 44 of the LED light source 40, and is also mounted on the pedestal 20, so that the apex 112 of the light guide is positioned near the centre 24 of the transparent globe 12. The driver circuitry (not shown) for the LED light source 40 is housed within the lower portion 14. The LED light source 40 is mounted in thermal contact with the pedestal 20 and the heatsink of the lower portion 14, for effective heat dissipation.

[1] An A19-type light bulb has a globe of 2⅜ inches in diameter, and the height of the light bulb is 4⅜ inches. A standard E26 base has a diameter of approximately 1 inch (26 mm). A conventional incandescent tungsten filament provides a substantially spherical omni-directional light distribution, such as shown in FIG. 14A.

FIG. 2 shows a schematic cross-sectional view of an optical device 2 comprising a cone light pipe or light guide according to a first embodiment similar to the optical device 1 shown in FIG. 1 (to facilitate comparison, corresponding parts are labelled with the same reference numerals incremented by 100). The light guide 2 has a generally conical form and comprises a body 200 of an optically-transparent material comprising a first, inner cone surface 202 and a coaxial second, outer cone surface 204. The surfaces have rotational symmetry around the vertical axis 210 (z-direction) of the cone. Each of the first and second cone surfaces 202 and 204, respectively, extend upwardly and converge to a rounded tip 212 at the apex of the conical body 200, and thus, define an outer cone 201, and an inner cone cavity 203.

Figure 7A:
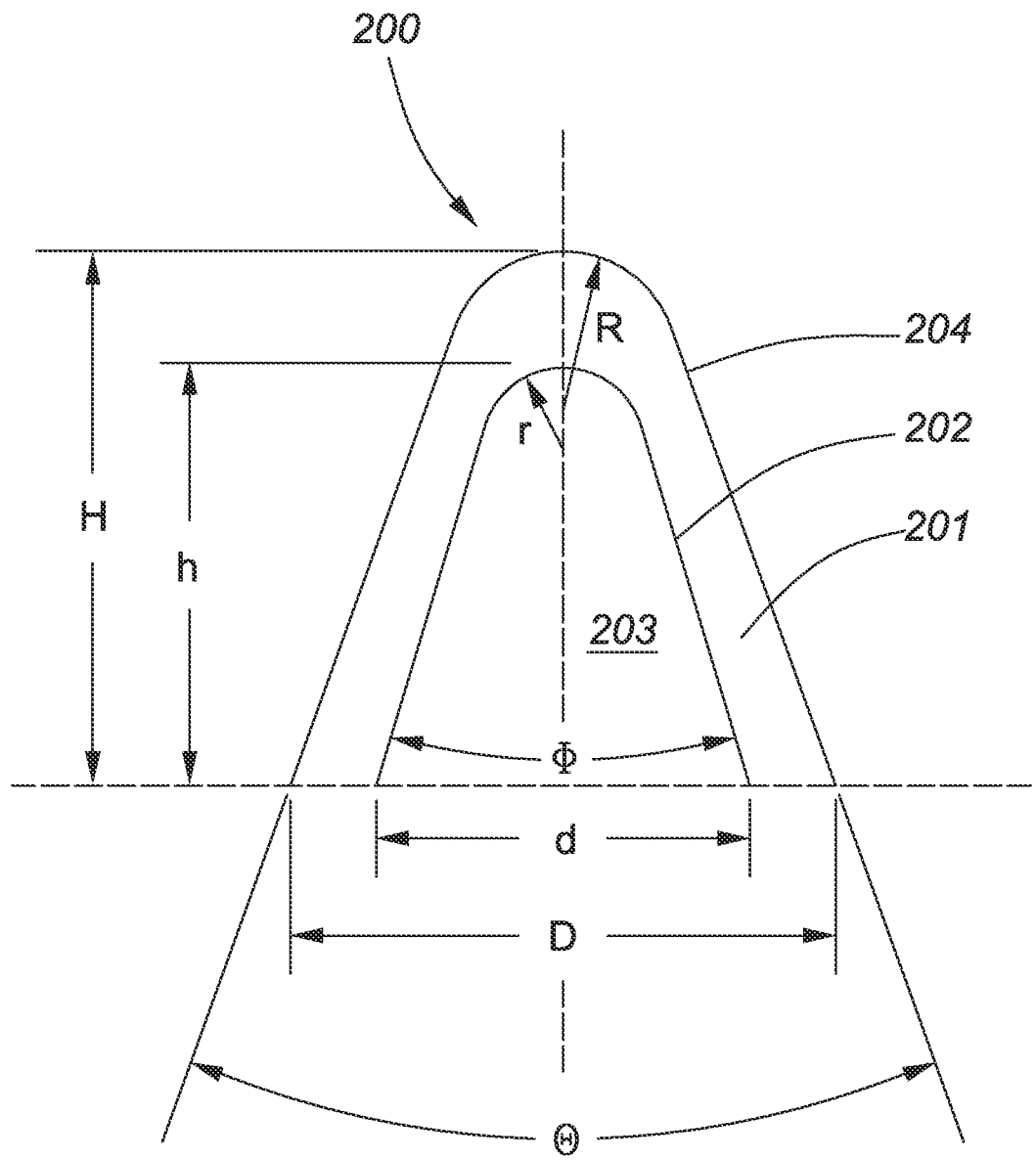
FIG. 7A shows a simplified schematic of part of the light guide shown in FIG. 2, to illustrate parameters defining the inner and outer cones.

A simplified view of part of the body 200, to illustrate parameters defining the structure, is shown in FIG. 7A. That is, the inner cone surface 202, defining the inner cone cavity 203, is defined by an inner cone angle Φ, a rounded tip with inner radius r, and inner height h, and a diameter d at the base of the cone. Correspondingly, the outer cone surface 204 is defined by an outer cone angle Θ, a rounded tip with outer radius R, an outer height H, and a diameter D at the base of the cone.

Referring back to FIG. 2, near the bottom of the conical portion of the body 200, the inner and outer cone surfaces 202 and 204, respectively, of the body 200 extend radially outwards and then downwards to form a base portion or mounting flange 206 of a larger diameter. The base 206 of the light guide body 200 is shown in FIG. 2, positioned over an LED light source 240, comprising a substrate 242 and an emitter area 244. The emitter area 244 of the LED light source 240 comprises, for example, a circular array of a plurality of LED emitters. The diameter d of the inner cone cavity 203 is matched to the diameter of emitter area 244 of the LED light source 240, and the light guide 200 is positioned with the vertical axis 210 (Z-axis) of the body 200 aligned over the centre of the LED light emitter area 244. Thus, the inner cone surface 202 encloses an inner cone or cavity 203 of refractive index $n_2$, in this case, air having a refractive index of 1. The body 200 of the light guide 2, forming the outer cone 201, comprises an optical material of a second higher refractive index $n_1$, preferably >1.4, e.g. optical-grade PMMA having a refractive index $n_2$=1.49. In this embodiment, the inner cone angle Φ is only a few degrees different than the outer cone angle Φ. Thus, in cross-section, the main portion of the body 200 defining the outer cone 201 has a substantially uniform thickness, defined by the coaxial inner and outer conical surfaces 202 and 204, respectively, which extend to the rounded apex portion 212. Ventilation holes or apertures 208 are provided at several locations around the base portion 206, i.e. to allow for airflow, which assists in heat dissipation from the LED light source 240.

FIG. 3 shows a schematic cross-sectional view of a cone light guide 3 according to a second embodiment. The light guide 3 is similarly defined by parameters Φ, Θ, r, R, h, H, d, D, as indicated in FIG. 7A. The outer form of the light guide 3, defined by outer conical surface 304, having an outer cone angle Θ, similar to that of light guide 2 shown in FIG. 2. However, the inner conical surface 302 has a larger cone angle Φ and tapers to a rounded tip 314 at a height h about half the height H of the rounded tip 312 of the outer cone surface 304, which results in a smaller inner cavity 303. As illustrated, the thickness of conical body 300 of the light guide 3 therefore increases gradually from a base portion 306 to the inner apex 314, and then rapidly to the solid upper tip 312 of the outer cone 301. The base portion 306 also comprises ventilation apertures 308. The cavity 303 is air filled, i.e. refractive index $n_2$=1 and aligns over an LED emitter area 344 of an LED light source 340. The conical body 301 of the light guide 300 comprises PMMA, having a refractive index of $n_1$=1.49, or other suitable optical material, preferably with an index of refraction >1.4. For example, flint glass may have a refractive index of 1.57.

Figure 17A:
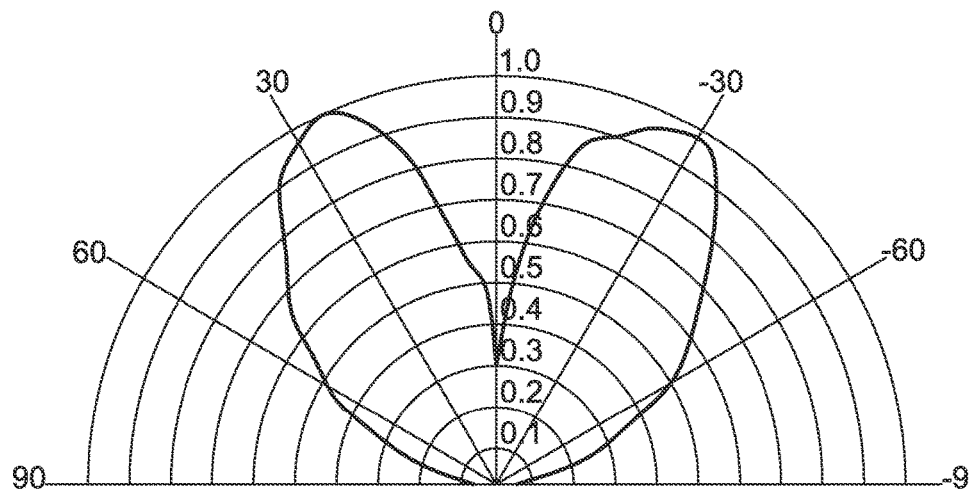
FIGS. 17A, 17B, and 17C show plots comparing the luminous intensity directional distribution measured for an optical system comprising an LED light source and a prototype cone-optic light pipe of each of the embodiments shown in FIGS. 2, 3 and 4, respectively.
Figure 17B:
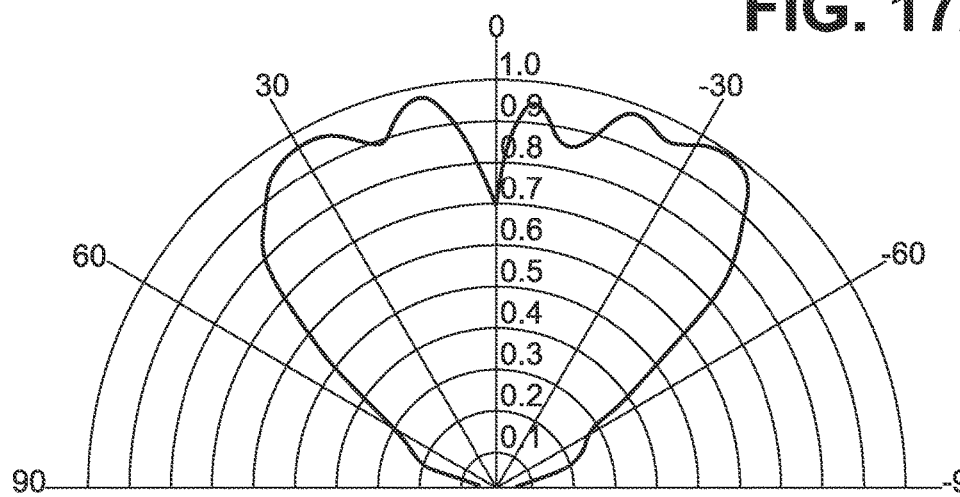

FIGS. 17A and 17B provide a comparison of the output light distributions from light guides 2 and 3 respectively, using the same input light distribution, i.e. the same LED light source. For example, the larger inner cone angle Φ of the inner cone surface 302 of cone optic 3 provides for a broader output light distribution relative to that of cone optic 2. As will be explained below, the inner cone angle Φ and outer cone angle Θ are primary parameters that provide control of the output light distribution. However, some of the dimensions of the optical device 2 or 3, e.g. base diameter and overall height of the optical device, are typically constrained by the form of the light bulb and parameters of the LED light source, for which it is designed. For example, for efficient light collection, the base diameter d of the inner cone cavity is preferably matched to the diameter of the LED emitter surface. The height H of the light guide is constrained in part by the dimensions of the light bulb for which it is designed. Thus, considering basic cone geometry, as represented in FIG. 7A, it is apparent that the range of inner cone angles Φ and outer cone angles Θ is constrained by the matching of d to the dimensions of the LED light emitter area, and the overall height H of the light guide.

FIG. 4 shows a schematic cross-sectional view of a cone light guide 4 according to a preferred embodiment of the present invention. The light guide 4 has a body 400 defined by inner and outer coaxial cone surfaces 402 and 404, respectively, forming an outer cone 401 and an inner cone cavity 403 with a rounded upper apex 412, similar to the light guide 200 shown in FIG. 2, except that both the inner and outer cone surfaces 402 and 404, respectively, further comprise a plurality of individual facets 420, 421, 422 and 424 (shown more clearly in FIGS. 5 and 6) that form a grating structure 426 and 428, respectively, on each of the inner and outer cone surfaces 402 and 404. Again, the inner cone, or cavity, 403 comprises a material of lower refractive index $n_2$, e.g. air or other gas having a refractive index of approximately 1. The body 400 of the light guide 4 forming the outer cone 401 of the light guide 4 comprises a transparent optical material such as glass or PMMA having a higher refractive index $n_1$, e.g. ≥1.4. The inner cone cavity 403 has a diameter d at the base that is matched to the size of an emitter surface 444 of an LED light source 440, formed on a substrate 442. Similar to light guides 2 and 3 of the embodiments shown in FIGS. 2 and 3, a base portion 406 forms a mounting flange and comprises apertures 408 for air flow to assist in thermal dissipation from the LED light source 440.

Figure 5:
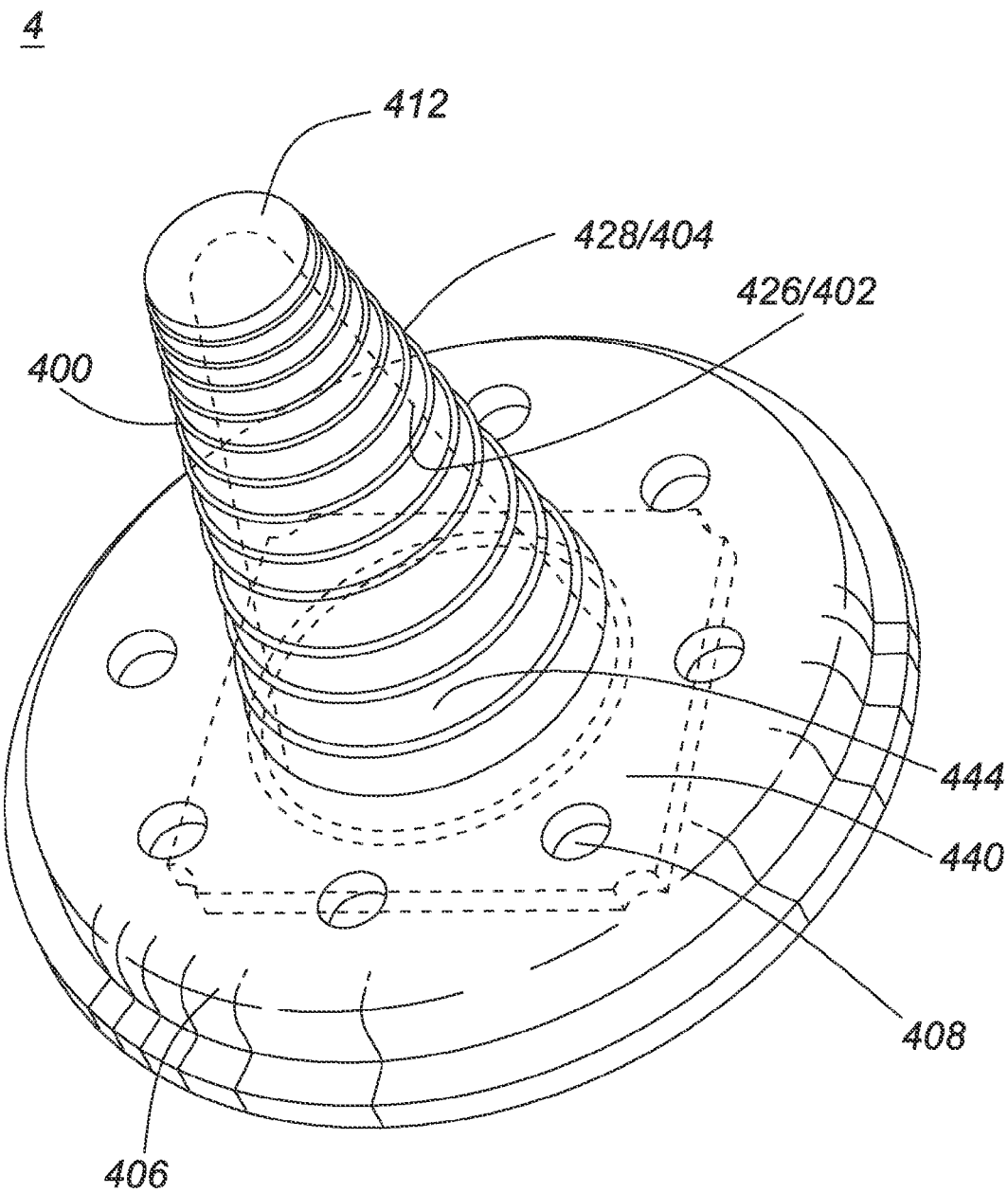
FIG. 5 shows a schematic perspective view of an optical system comprising an assembly of a solid-state light-emitting source and a light guide similar to that shown in FIG. 4.
Figure 6:
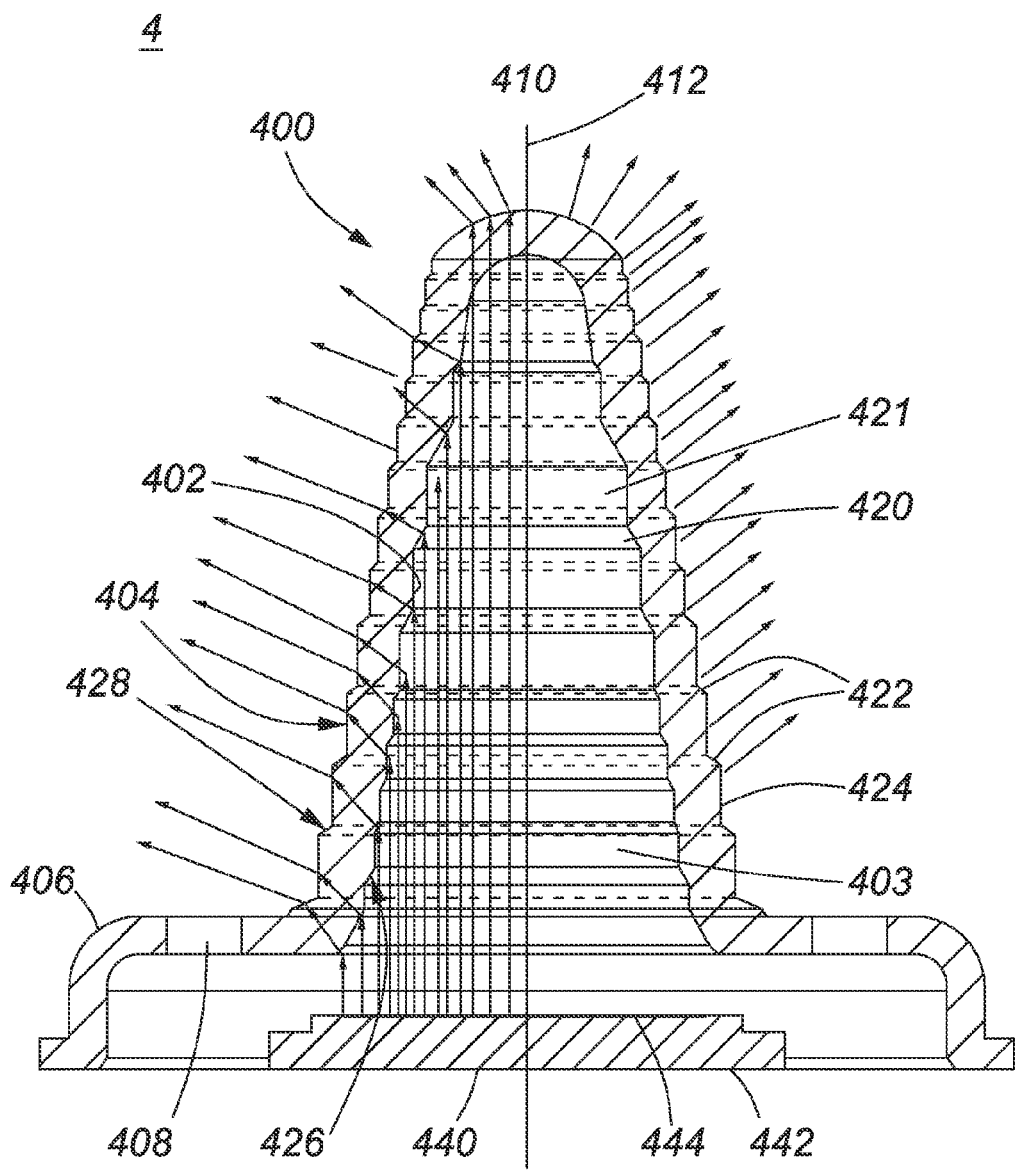
FIG. 6 shows a cross-sectional view of a cone-optic light guide and LED light source similar to that shown in FIG. 5, showing details of the outer cone surface and the inner cone (cavity) surface, each comprising multiple facets forming, respectively, an outer grating structure and an inner grating structure.

As shown in more detail in FIGS. 5 and 6, light guide 4 comprises a plurality of conical (specifically frusto-conical) facets 420 and 422 and a plurality of cylindrical spacing facets 421 and 424 forming an inner grating structure 426 and an outer grating 428 on the respective inner and outer cone surfaces 402 and 404. The conical facets 422 of the outer grating 428 taper towards the apex, i.e. at an acute angle to longitudinal Z-axis of body 400, and have larger cone angles than the outer cone angle Θ of the envelope of surface 404. The cylindrical facets 424, have substantially vertical walls parallel to longitudinal Z-axis of body 44, and provide axial or vertical spacings between the conical facets 422. Similarly, a second plurality of conical facets 420 and cylindrical spacing facets 421 form the inner grating structure 426, which differs in configuration from the outer grating structure 428. The gratings 426 and 428 on each of the respective inner and outer cone surfaces, 402 and 404, are structured to provide for further reshaping of the input light distribution, relative to the simple conical light guide structures 2 and 3, shown in FIGS. 2 and 3. Thus, the light guide 4 results in a broader output light distribution shown in FIG. 17C.

The configuration of the respective facets 422 and 424 on the outer cone surface 404 defining the outer grating structure 428, and the respective facets 420 and 421 on the inner cone surfaces 402 defining the inner grating structure 426, are determined by optical modelling, and will be described in detail with reference to FIGS. 5 through 16.

Referring now to FIG. 5, this Figure shows a perspective view of an assembly of the light guide 4 and the LED light source 440, similar to that shown in FIG. 4 showing the inner and outer cone surfaces 402 and 404, respectively. The conical body 400 is mounted over the solid-state LED light source 440. The inner cone surface 402 comprises a plurality of tapered and cylindrical facets 420 and 421 that form an inner grating 426. The outer cone surface 404 comprises a plurality of facets 422 and 424 that defines the outer grating 428. As illustrated schematically, the diameter of the inner cone surface 402 near the base 406 is matched to the diameter of the LED light source emitter surface 444 for effective collection of the input light distribution emitted from the LED light source 440. The plurality of apertures 408 are arranged around the base 406 for air flow to assist in heat dissipation, e.g. to avoid creating a thermal pocket within the inner cone cavity 403.

FIG. 6 shows an enlarged cross-sectional view of the structure of optical device 4 shown in FIGS. 4 and 5, showing details of the inner facets 420 and 421, and the outer facets 422 and 424, defining the respective inner and outer grating structures 426 and 428, of the inner and outer cone surfaces 402 and 404, respectively. As illustrated in FIG. 6, each of the respective inner and outer cone surfaces 402 and 404 comprises a series of a plurality of alternating coaxial conical facets 420 and 422, and cylindrical facets 421 and 424, which diminish in diameter towards the apex 412. As shown, the cone angles of individual inner tapered facets 420 can vary or be the same in angle and in length along the inner surface 402. Also, the individual outer tapered facets 422 can vary or be the same in angle and in length along the outer surface 404, and vary from the angle and length of adjacent inner tapered facets 420. Furthermore, the individual vertical spacings of the inner cylindrical facets 421 vary in height along the length of the inner surface 402, as well as the vertical spacings of individual outer cylindrical facets 424 vary in height along the outer surface 404, and differ from adjacent inner cylindrical facets 421. Accordingly, the respective inner and outer grating structures 426 and 428 are not uniform grating structures along their own lengths, i.e. over their height from the base to the apex. For example, as illustrated in FIG. 6, the outer grating structure 428 has generally larger conical facets 422 and spacings for cylindrical facets 424 near the base, and smaller, more closely spaced respective conical and cylindrical facets 422 and 424 near the top 412, while the inner grating structure 426 has some more closely spaced inner conical facets 420 and cylindrical facets 421 near the bottom than the top. The structures of the inner grating and outer gratings are tailed for a specific input light distribution from the LED.

The individual conical/tapered facets, 420 and 422 and substantially cylindrical spacing facets 421, 422 and 424, are configured to transform a predetermined input light distribution received from the LED light source 440 and generate an omni-directional output light distribution. Since an LED input light distribution is not uniform over the emitter area, non-uniform inner and outer grating structures 426 and 428, respectively, provide additional parameters for shaping the omni-directional output distribution of light. The inner and outer grating structures 426 and 428 are determined by optical modelling, based on a particular input light distribution from the LED light source for which the cone optic is designed.

Considering a ray-tracing model, as will be appreciated, each light ray emitted from the LED light source 440 will undergo reflection, refraction, and/or total internal reflection (TIR) at the inner and outer cone surfaces 402 and 404, depending on the angle of incidence and refractive indices $n_1$ and $n_2$. For simplicity, as illustrated schematically in FIG. 6, only light rays emitted vertically from the LED emitter surface 444 are shown, although light rays are emitted in many directions from the LED emitter surface 444. That is, FIG. 6 shows only a few light rays emitted in a direction normal to the flat surface 444 of the LED light source 440, i.e. in the Z-direction along the cone axis 410. As shown schematically, each ray is refracted by a conical facet 420 of the inner cone surface 402, changes direction, and passes through the conical body 401, and is then further refracted by the outer cone surface 404, i.e. either at an outer conical facet 422 or outer cylindrical facet 424, to further change direction. For example, depending on the angle of incidence and the refractive indices $n_2$ of the inner cone and $n_1$ of the outer cone, a light ray parallel to the axis may be refracted or partially refracted (and partially reflected) at a first angle away from the longitudinal Z-axis at the first interface between air cavity and inner cone surface 402, depending on the ratio of the refractive indices of the materials, e.g. according to Snell's law and the laws of reflection, and it will then be further refracted or partially refracted (and partially reflected) at another angle from the longitudinal Z-axis at the interface between the outer cone surface 404 and the surrounding ambient, i.e. cone/air interface according to Snell's law. Thus, as illustrated schematically, to first order, for parallel rays only, the grating structures 426 and 428 of the light guide 400 is configured to transform a parallel input light distribution from the LED light source 440 to provide a desired light distribution over a wider angular distribution, e.g. an omni-directional light distribution, similar to that of an incandescent light bulb.

Of course, rays emitted in other directions (i.e. non-parallel to Z-axis) from the LED light source 440 also contribute to the light distribution. Moreover, some rays may undergo refraction, reflection, total internal reflection (TIR) and/or scattering at multiple interfaces, and/or undergo partial reflection at multiple surfaces before exiting the light pipe 4. Thus, complete modelling of a light guide, such as light guide 4 with both inner and outer grating structures 426 and 428, is complex. In practice, a simplified model is required to configure the structure of the inner and outer gratings 426 and 428 of a light guide to provide a desired omni-directional output light distribution based on a predetermined input light distribution from a particular LED light source.

Figure 7B:
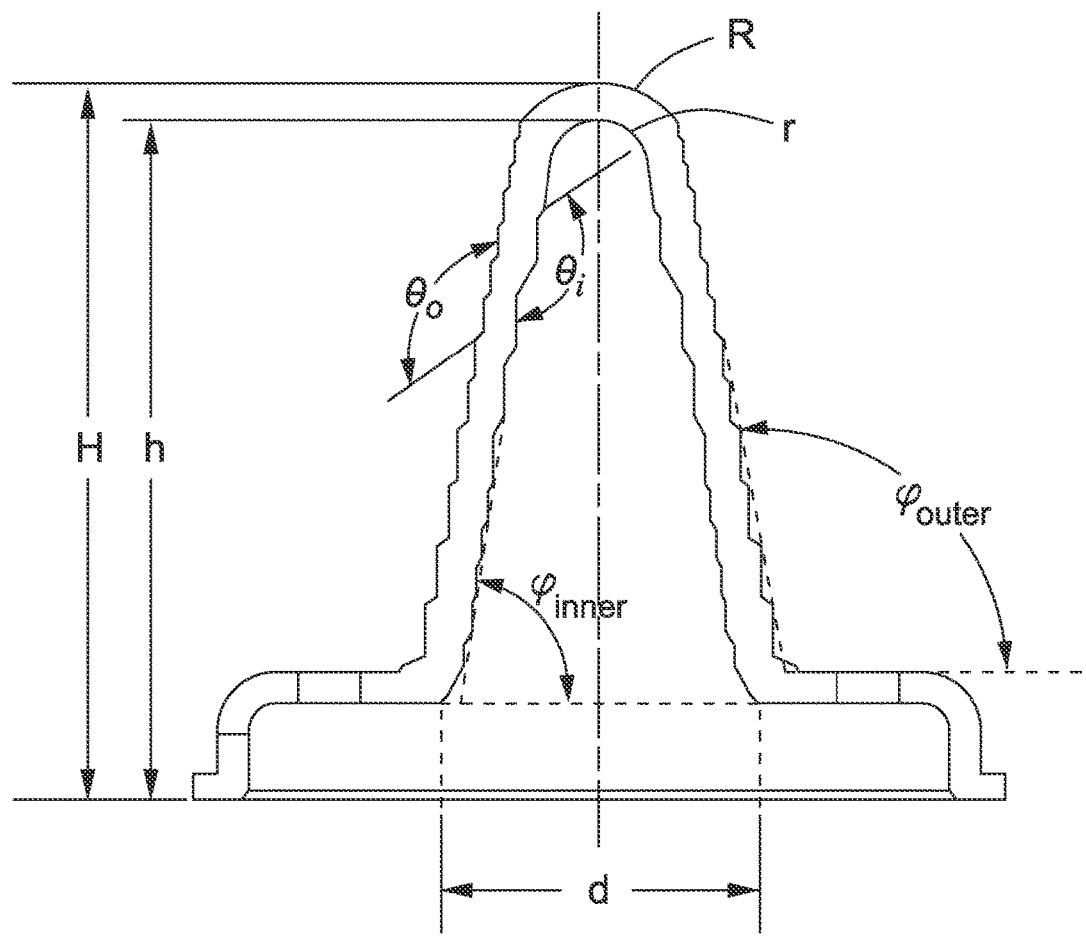
FIG. 7B shows a schematic cross-sectional view of the light guide, similar to that shown in FIG. 6, indicating optical parameters for first-order and second-order calculations defining the light guide structure.

The transmission intensity and emission angle of the light rays are a function of the optical parameters, dimensions, geometry and grating structures 426 and 428 of the cone light guide 400. These parameters are represented schematically for a simple conical light guide in FIG. 7A and for an exemplary light guide comprising inner and outer gratings 426 and 428 in FIG. 7B, and include:

the ratio of the height h of the inner cone surface 402 and height H of the outer cone surface 404;

the radius r of the rounded tip 412 of the inner cone surface 402, and the radius R of the rounded tip 412, which forms the apex of the outer cone surface 404;

the cone angles $\Phi$, $\Theta$ respectively of the inner cone surface 402 and outer cone surface 404;

the cone angles of respective inner and outer conical facets 420 and 422 defining the grating structures of respective inner and outer cone surfaces 402 and 404, i.e. angles $\theta_{outer}$, $\theta_{inner}$, and $\phi_{outer}$, $\phi_{inner}$, as indicated in FIG. 7B; and the vertical or axial spacings between the conical facets, i.e. the heights of the inner and outer spacing facets 421 and 424.

Figure 13A:
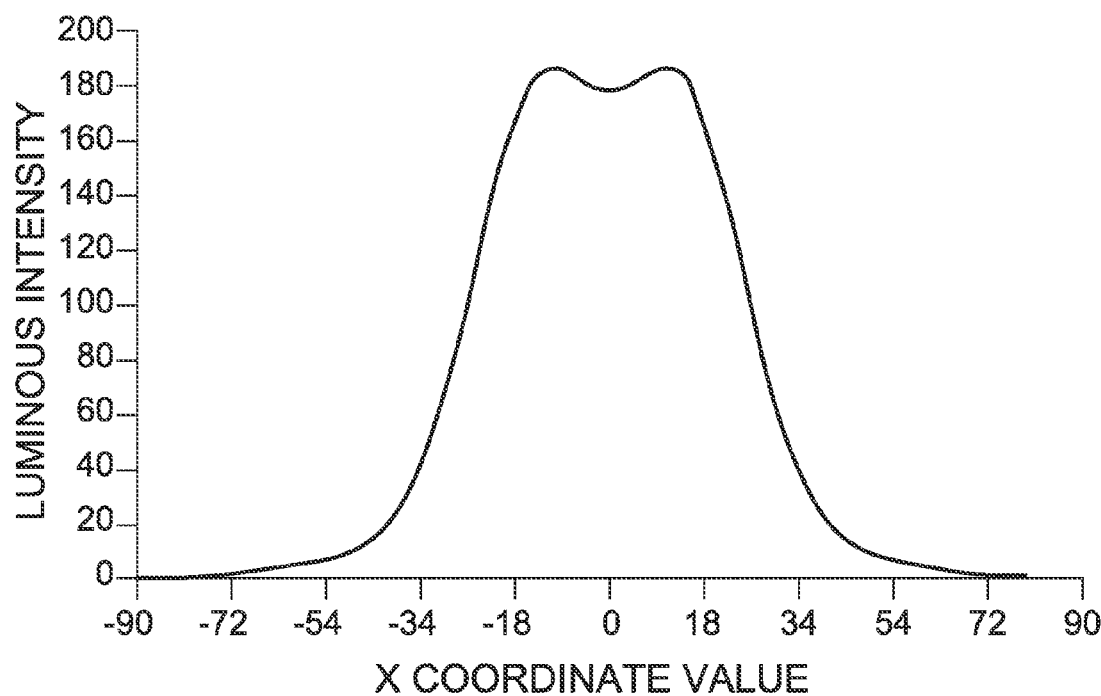
FIGS. 13A and 13B shows plots of the luminous intensity distribution of the LED light source in the X direction, and in the Y direction, relative to cone axis Z.
Figure 13B:
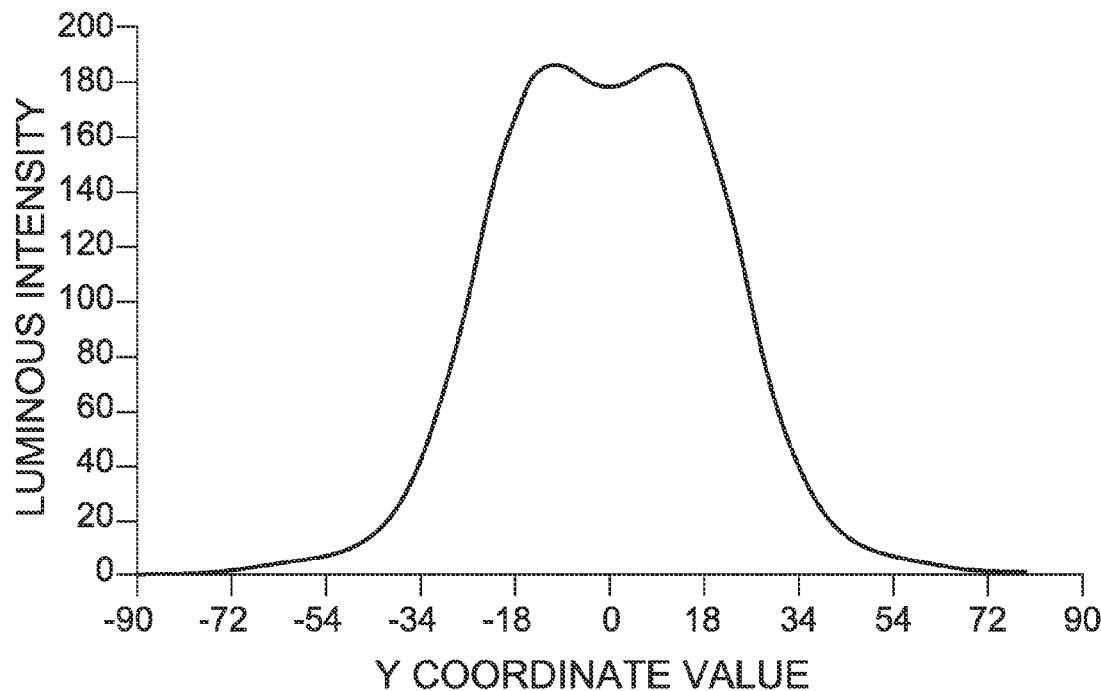

For a solid-state lighting system comprising an assembly of a light guide and LED light source assembly designed as an incandescent light bulb replacement, such as shown as shown in FIG. 1, the dimensions of the light guide are constrained in part by standard light bulb dimensions. The parameters of the light guide are tailored to redistribute the input light distribution, i.e. the light emission of a particular LED light source, e.g. having a planar, circular emitter area of a diameter d producing a known light distribution, typically a Gaussian or super-Gaussian light distribution (such as shown in FIGS. 13A and 13B). Thus, referring to FIG. 7B, and as shown in the cross-sectional view in FIG. 6, for example, the optical device 400 is designed to couple the inner cone cavity 403 directly to the flat surface of the emitter 444, of diameter d.

As a starting point, the bottom diameter d of the inner cone 403 is matched to the diameter d of the emitter area 444 of the LED light source 440. The height H of the conical body 400 is selected for mounting on the baseplate of a standard LED bulb configuration, so as to place the apex 412 of the cone at an appropriate position within the conventional globe or glass envelope of the light bulb, e.g. near the centre, similar to the position where a conventional incandescent tungsten filament would be centred. The overall height H (as indicated in FIG. 7B) of the cone optic 400 may include the mounting flange/base 406, which is mounted so as to leave a gap between the LED substrate 442 and the ventilation apertures 408 for heat dissipation. The dimensions d and H are, thus, determined by a particular LED light source and bulb format. In an optical device 2 according to the first embodiment, shown in FIG. 2, comprising simple first and second cones 201 and 203 respectively, defined by respective coaxial inner and outer cone surfaces 202 and 204 (i.e. effectively only one inner cone facet and one outer cone facet), the bottom diameter d of the inner cone cavity 203, the inner cone height h and the outer cone height H, are the first-order parameters that define the cone angles $\Phi$ and $\Theta$ of the inner and outer cone surfaces 202 and 204, respectively. That is, the inner cone angle $\Phi$ of the inner cone cavity 203 is defined by the diameter d of the base of the inner cone 203 and height h. Similarly, the outer cone angle $\Theta$ of the outer cone surface is defined by the outside diameter at the base of the outer cone 201 and its height H. Thus, this simple structure provides limited control over the output light distribution. As shown in FIG. 17A, the output light distribution is broadened relative to the input light distribution from the LED light source, but it is more similar to the narrow distribution of a candelabra bulb relative to an A19-type bulb.

In an optical device 3 according to the second embodiment, as shown in FIG. 3, the inner cone 303 has a similar bottom diameter to that shown in FIG. 2, but the inner cone surface 302 has a significantly lower inner cone height h and a larger inner cone angle $\Phi$. The outer cone height H and outer cone angle $\Theta$ are similar to those shown for the device 2 in FIG. 2. The larger inner cone angle $\Phi$ results in an output light distribution as shown in FIG. 17B, which is broadened relative to that shown in FIG. 17A.

Figure 14:
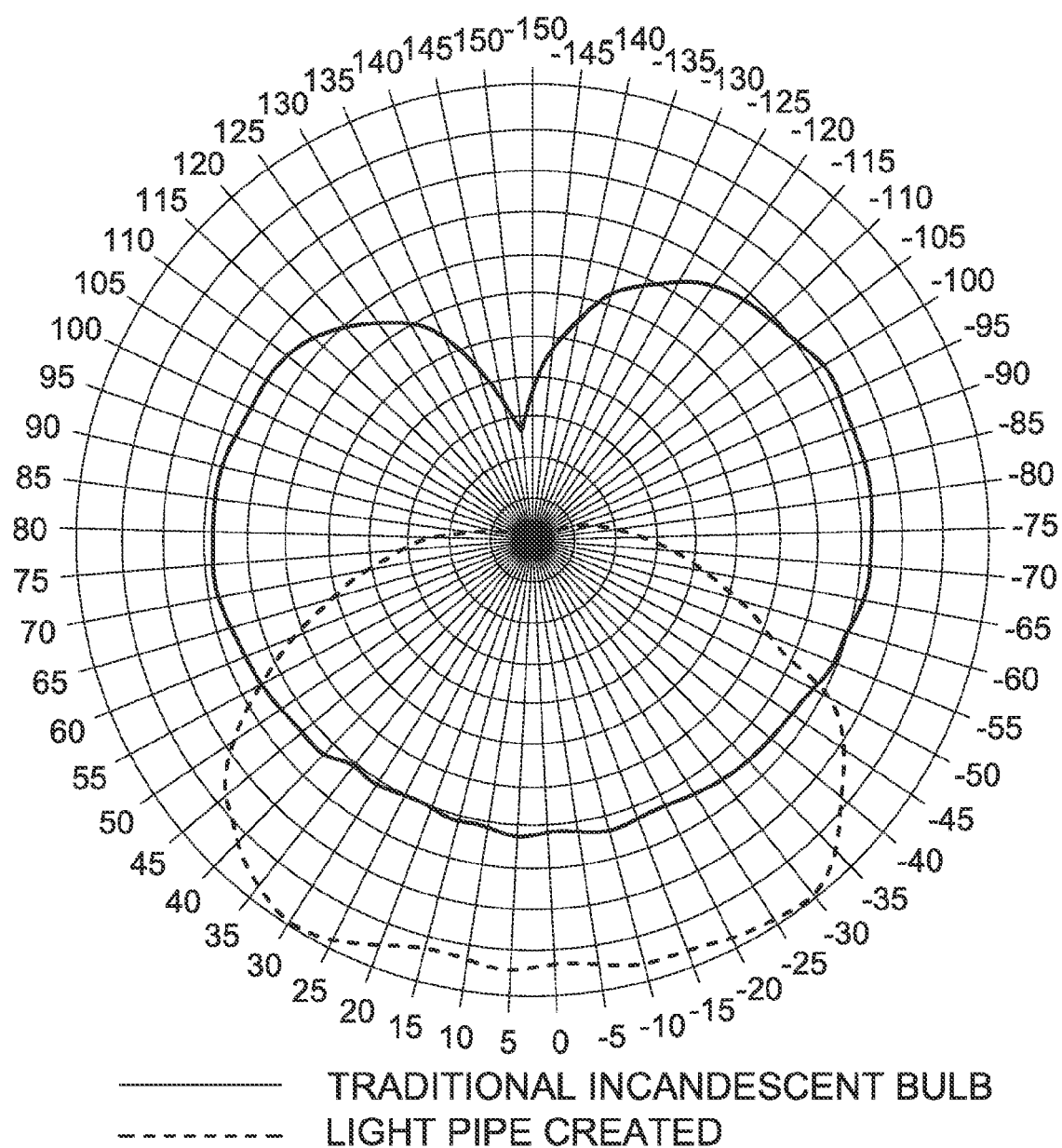
FIG. 14 shows plots comparing the luminous intensity directional distribution for: a conventional incandescent light bulb (solid line); and the optical system comprising an LED light source and a cone-optic light pipe, of an embodiment similar to that shown in FIG. 8 (dashed line)

For an optical device 4 according to the preferred embodiment as shown in FIGS. 4 through 7, both the inner cone surface 402 and outer cone surface 404 comprise multiple facets, which form inner and outer grating structures 426 and 428, respectively. The inner cone surface 402 comprises an inner grating structure 426 comprising a first plurality of facets 420, 421. The outer cone surface 404 comprises an outer grating structure 428 comprising a second plurality of facets 422 and 424. The cone angles of the individual facets 420, 421, 422 and 424 defining the respective inner and outer cone surfaces 402 and 404, i.e. angles $\theta_{outer}$, $\theta_{inner}$, and $\phi_{outer}$, $\phi_{inner}$, as shown in FIG. 7B, provide further, second-order parameters for shaping the angular light distribution to provide a more optimal omni-directional light distribution, as shown in FIG. 14 (dashed line) or FIG. 17C.

Figure 17C:
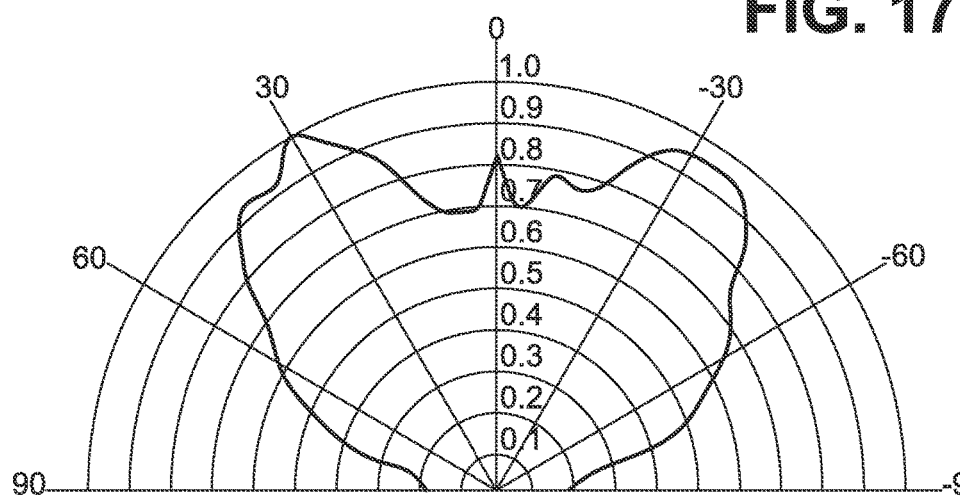

In particular, the device shown in FIGS. 4 through 6 comprises an arrangement of alternating conical facets 422 of larger cone angles and cylindrical facets 424, which diminish in diameter toward the rounded apex 410. In particular, the optical device 4 has a similar overall height H to the optical device 2 shown in FIG. 2, but provides inner and outer conical facets 420 and 422, respectively, with inner and outer cone angles $\theta_{outer}$, $\theta_{inner}$, and inner and outer cylindrical facets 421 and 424, respectively with inner and outer cone angles $\phi_{outer}$, $\phi_{inner}$, which may be larger than the inner cone angle $\Phi$ and outer cone angle $\Theta$ defining the (cone) envelope of the faceted inner cone surface 402 and the faceted outer cone surface 404. For example, for a conical body having a given base diameter d, and height h of the inner cone, this constrains the inner cone angle $\Phi$. By providing the grating structures 426 and 428 comprising multiple facets 420, 421, 422 and 424, each facet may have a different cone angle larger or smaller than $\Phi$, i.e. conical facets with a larger cone angle and spacing facets with a smaller or near zero cone angle. It should be noted that, preferably, all surfaces and facets 420, 421, 422 and 424 of the body 400 taper towards the apex 412 to facilitate fabrication by one-step injection molding. The grating structures 426 and 428 are non-uniform. The cone angles and spacings of each individual facet 420, 421, 422 and 424 may be individually selected. Alternatively, the conical facets 420 and 422 may be arranged in groups or families, e.g. a group of a series of similar facets with larger spacings near the base, and one or more groups of smaller facets and facet spacings towards the apex 412. As shown in FIG. 17C, the light guide 4 results in a broader, more omni-directional output light distribution.

Figure 8:
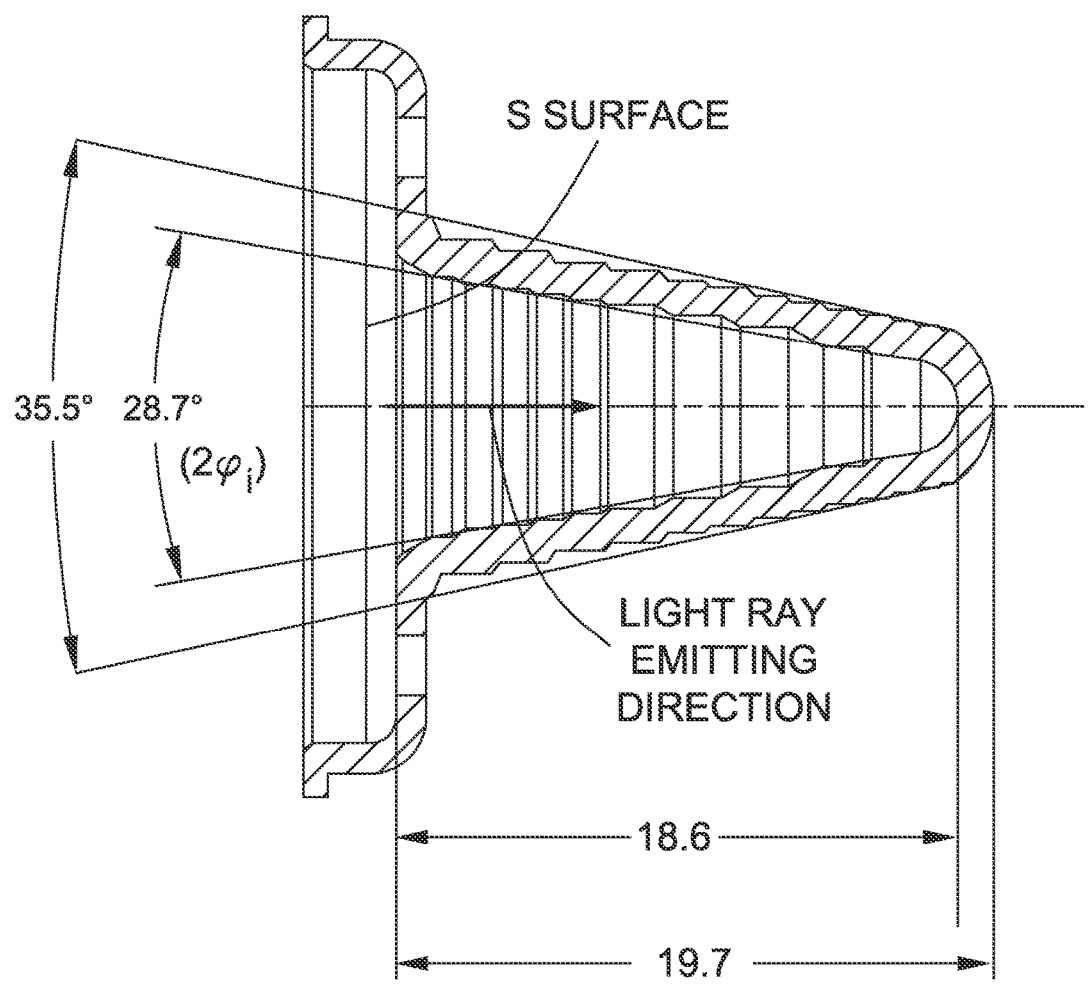
FIG. 8 shows another cross-sectional view of a cone-optic light pipe, similar to that shown in FIG. 6, showing the dimensions and inner and outer cone angles for a light guide configured for use with a white light LED light source having a diameter of ~10 mm and suitable for use in an A19-type light bulb.

FIG. 8 shows the dimensions of a light guide, similar to conical light guide 4, according to an embodiment designed for an A19-type bulb, e.g. similar to that shown in FIG. 1. As shown in FIG. 8, each of the inner cone surface 402 and outer cone surface 404 comprises a respective inner and outer grating structure 426 and 428. The light guide, including the base portion and the conical portion, has an overall height of 22.7 mm and a base diameter of 25.4 mm. In this particular example, the inner and outer cone heights H and h (excluding the base, in this case) are 19.7 mm and 18.6 mm, respectively. The diameter of the inner cone 403 at the base is sized for a LED emitter surface of 10 mm in diameter. The outer cone angle Θ is 35.5°, but could vary, e.g. between 30° and 40°, and the inner cone angle Φ is 28.7° ($2\phi_i$), but could also vary, e.g. between 25° and 30°. As mentioned above, the diameter of the base of the inner cone cavity 403 is determined by the diameter of the area of the emitter 444 for which the light guide is designed. Thus, the inner and outer cone angles Φ and Θ are defined or constrained by the diameter of the base of the inner cone cavity 403 and outer cone 401, and the respective inner and outer cone heights h and H. In practice, the specific inner and outer cone angles Φ and Θ will be determined by, or tailored to, the specific LED light source 440 and bulb configuration to be used. The facets 420, 421, 422 and 424 of the respective inner and outer cone surfaces 402 and 404 comprise alternating conical surfaces with cone angles $\theta_{outer}$, $\theta_{inner}$, and $\phi_{outer}$, $\phi_{inner}$ (which may differ from Φ and Θ) and cylindrical or spacing surfaces (cone angle near zero, or preferably ≤1°) that are coaxial, and diminish successively in diameter towards the apex 412. The arrangement of grating structures 426 and 428 is similar to that shown in FIG. 6. Each facet 420, 421, 422 and 424 of the grating structures 426 and 428 of the respective inner and outer cone surfaces 402 and 404 is tailored, to first order, to redirect vertical rays from a portion of emitter area 444 of the LED 440, given a predetermined input light distribution from the LED 440. Optical modelling of this structure is described in detail below.

Optical Modelling

In developing the cone-optic structure, the fundamental theory may be described in terms of wave theory, based on Maxwell's equations. However, as is well known, in many situations, light can be thought of as rays directed along the flow of energy. Therefore, for optical modelling, a ray-tracing technique was applied to determine the macroscopic distribution of light energy, i.e. to predict how the light intensity and direction of propagation is reshaped by the cone optic light guide.

The characteristics of the LED light source are typically provided by the manufacturer, e.g. the geometric light distribution and the spectral/wavelength distribution.

For first-order analysis, the light distribution generated by the light guide is modelled for parallel rays only, i.e. those emitted normally (at 90°) from a planar LED emitter area. For second-order analysis, more complex ray-tracing is performed.

In the analysis of the cone optics light guide structure as presented below, the light guide is designed to work with an emitting light source having a flat surface, i.e. without an integrated dome lens. The aperture of the cone cavity, i.e. its base diameter, is sized to envelop substantially 100% of the parallel light source beam that launches from the light source into the light guide in the direction of the cone axis.

The transmission pattern of the light is determined by a combination of grating features on the inner and outer surfaces of cone optics light guide, to provide an omni-directional emission pattern, for far-field viewing. Desirably, the light guide provides a transmission efficiency greater than 90% over the visible wavelength, and an angular distribution of greater than 140° relative to the flat light-emitting surface of the LED light source.

For example, the light guide can be fabricated from transparent PMMA having a refractive index $n_2=1.49$ (at 610 nm, 20° C. ambient), and the inner cavity comprises air, having a refractive index $n_1=1$. The surrounding air environment also has the same refractive index, $n_1$.

Geometric Optical Design

The optical device functions to guide light from the light-emitting source to the surface that is to be illuminated, by reflection, refraction or total internal reflection (TIR) of light by the inner and outer surfaces of the light guide. When a light ray reaches an interface between optical media of different refractive indexes, e.g. at the interface between air and the internal cone surface, or at the external cone surface/air interface, a ray may be reflected or refracted, as determined by the classical equations of geometric optics. TIR occurs for light traveling from a medium of a higher index of refraction to a medium of lower index of refraction, if a ray of light intersects the interface at an angle exceeding the critical angle.

Mathematically, the critical angle $\theta_c$ between a material of index $n_{material}$ and air of index $n_{air}$ is defined as follows:

$$\theta_c = \sin^{-1}\left(\frac{n_{air}}{n_{material}}\right) \qquad \text{Equation 1}$$

For PMMA material of n=1.49, the critical angle is approximately 42.16°. If a light ray inside the material hits the cone cavity surface (inner surface) of the light guide at an angle less than the critical angle, part of the light is reflected and transmitted according to Snell's law and the Fresnel's reflection and transmission relationships. Among other processes such as refraction, reflection, and scattering, TIR may be the primary process for light ray transmission of a light ray through the body of a light guide.

The design of the light guide starts with first-order calculations based on the parameters shown in FIG. 7A, that is the inner and outer heights h and H, the inner and outer radii r and R of the apex, and the inner and outer cone angles Φ and Θ. In practice, modelling of the light guide design is more complex than such first-order calculations can predict, but these calculations provide a determination of whether the potential design outcome can come close to satisfying the performance requirements. The angles $\theta_{inner}$, $\phi_{inner}$, and $\theta_{outer}$, $\phi_{outer}$, of the facets 420, 421, 422 and 424 of the inner and outer grating surfaces 426 and 428 provide second-order parameters for controlling the omnidirectional light distribution. Therefore, the configuration of the light guide is driven primarily by constraints on dimensions, such as d and H, to match a particular LED light source and bulb format, while other parameters, as shown in FIGS. 7A and 7B, defining the individual facets 420, 421, 422 and 424 and the rounded tip 412, are adjusted to tailor the output light distribution dependent on the input light distribution from the LED 440.

The parameters used for the first-order calculations are listed in Table 1 below.

TABLE 1

Performance requirements and physical properties

| Optical Performance Requirements | Physical Property |
| --- | --- |
| Power | Amplitude (Gaussian/FWHM) |
| Intensity | Polarization (Fresnel relationships) |
| Irradiance | Amplitude (Fresnel relationships) |
| Radiance L | Phase (aberrations) |

In Table 1, Radiance is the power per unit projected area per unit solid angle, and the radiance L is a dominant figure for the cone optics geometry, as defined by Equation 2:

$$L = \frac{d^2\emptyset}{dA\cos(\theta)d\varpi} \quad \text{Equation 2}$$

The radiance is conserved and, in the event of transmission losses, the étendue is "throughput" or the "AΩ" product, because it is the product of the cross-sectional area of a beam, at a location in the optical path, and its projected solid angle. Assuming the power loss in the light guide is purely due to the optical transmission losses, then the fundamental relationship between these parameters is shown in FIG. 8.

Figure 9A:
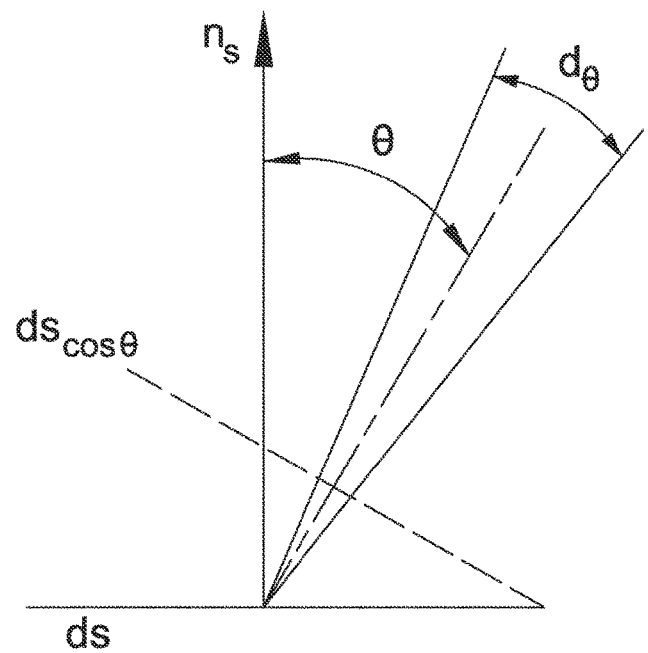
FIGS. 9A and 9B shows a schematic diagrams, in two and three dimensions respectively, illustrating the étendue of light crossing an infinitesimal surface element dS, for light emitted over a solid angle dΩ at an angle θ with respect to the normal $n_s$.
Figure 9B:
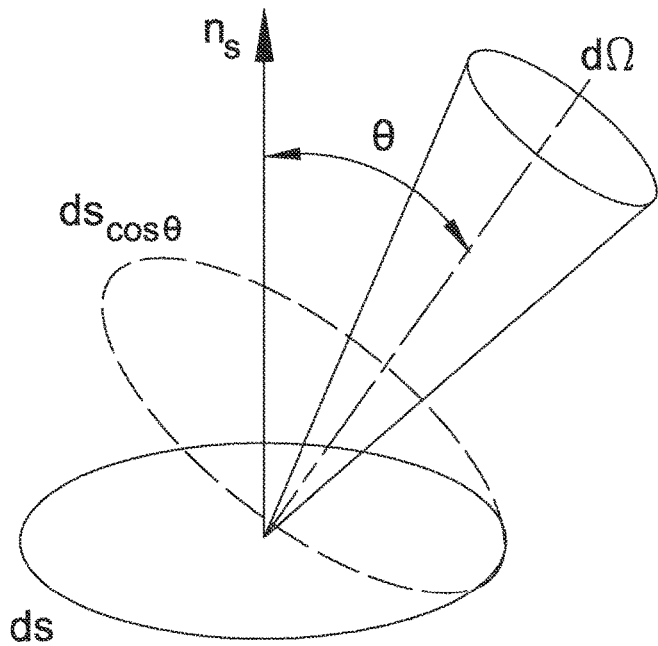

The radiance is conserved if light propagates between two differential areas without loss, as illustrated in FIGS. 9A and 9B. Assuming a constant radiance, then the amount of power transferred out of a differential area and its solid angle is given by Equation 3:

$$\emptyset = L\iint dA\cos(\theta)d\overline{\omega} = LA\Omega \quad \text{Equation 3}$$

Figure 10:
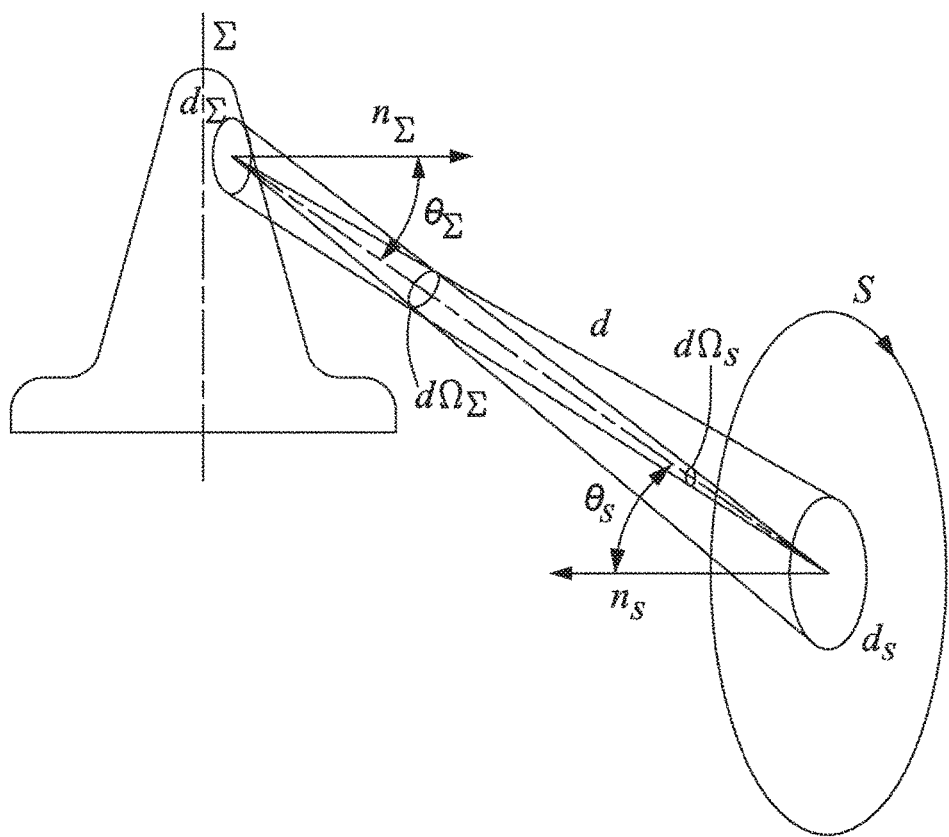
FIG. 10 shows a diagram illustrating the étendue in three dimensional free space, for the étendue of a light ray crossing dΣ towards dS.

FIG. 10 shows the étendue in three-dimensional free space, the étendue of the light ray crossing dΣ towards dS. Σ is a light source, and S is a light "receiver", both of which are extended surfaces, and which are separated by a medium of refractive index n that is perfectly transparent. Therefore this is given by Equation 4:

$$d^2 G_\Sigma = n^2 d\Sigma \cos\theta_\Sigma d\Omega_\Sigma = n^2 d\Sigma \cos\theta_\Sigma \frac{dS\cos\theta_S}{d^2} \quad \text{Equation 4}$$

In Equation 4, $d\Omega_\Sigma$ is the solid angle defined by area dS at area dΣ. Accordingly, the étendue of the light ray crossing dS coming from dΣ is given by Equation 5:

$$d^2 G_S = n^2 dS\cos\theta_S d\Omega_S = n^2 dS\cos\theta_S \frac{d\Sigma\cos\theta_\Sigma}{d^2} \quad \text{Equation 5}$$

This indicates the étendue is conserved as light ray preparation in free space. When both surfaces dΣ and dS are immersed in air, n=1, then the étendue can be expressed in Equation 6:

$$d^2 G = d\Sigma\cos\theta_\Sigma \frac{dS\cos\theta_S}{d^2}$$

$$= \pi d\Sigma \left( \frac{\cos\theta_\Sigma \cos\theta_S}{\pi d^2} dS \right) \quad \text{Equation 6}$$

$$= \pi d\Sigma F_{d\Sigma \to dS}$$

In classical geometric optics theory, the $F_{d\Sigma \to dS}$ is called the view factor: it defines the étendue that can be obtained between two distanced surfaces, so that the cone optics geometry can be defined specifically as a function of angles and refractive indexes.

In this particular approach for the creation of a light pipe comprising cone optics, the light ray source is immersed in air $n_{air}=1$ and emitting into the cone cavity, confined to an angle α, and cone geometry has an angle $\phi_i$, with the cone cavity surface collecting the light ray within a solid angle of $2\phi_i$. When light rays are transmitted into PMMA medium $n_{material}=1.49$, the light pipe is illuminated as TIR occurs. The grating features 428 on the outer cone surface 404 further widen the light ray angle of rays emitted outwards from the cone optic. Also, for this cone optics light source location arrangement, the étendue of a light ray has minimum aperture for a full angle 2α output. Theoretically, the conic angle of cone optic light pipe must be less than 90°.

ZEMAX™ Modelling and Analysis

ZEMAX™ Optical Design software was used for modelling, analyzing and assisting in the design of the cone optic light pipe 400, primarily as raytracing in non-sequential mode. Non-sequential ray-tracing means rays are traced only along a physically realizable path until they intercept an object. The ray then refracts, reflects or is absorbed depending upon the properties of the object struck. After that the ray continues on a new path. In non-sequential ray-tracing, rays may hit any group of objects in any order, or may hit the same object repeatedly; depending upon the geometry and properties of the objects. Partially reflected rays can be generated and traced from a refractive interface, in addition to tracing the reflected ray. This is referred to as ray splitting. Hence, both reflected and refracted rays were traced. Three components were modelled in ZEMAX; a light source, the cone optics light guide, and a detector. The light source was modelled as emitting five million rays which were launched into the cavity of the cone optics light guide. The rays were then propagated inside the optical medium of the body of the cone optic (i.e. PMMA). The light rays propagated through the light guide that reached the detector were recorded.

Before simulating the optical output of the light guide, the light source model must be determined. In ZEMAX the light source model for the LED light source was defined in the form of intensity distribution given by Equation 7:

$$I(\theta_x, \theta_y) = I_o e^{-2\left(\left(\frac{\theta_x}{\alpha_x}\right)^{2G_x} + \left(\frac{\theta_y}{\alpha_y}\right)^{2G_y}\right)} \quad \text{Equation 7}$$

where, $\alpha_x$ is the XZ divergence angle in degrees, $G_x$ is the "super Gaussian" factor for the X direction; $\alpha_y$ is the YZ divergence angle in degrees and $G_y$ is the "super Gaussian" factor for the Y direction.

Most LED manufacturers specify the far-field divergence angles as the full width of the distribution between the half power points, $\theta_{fwhm}$. For a true Gaussian distribution ($G_x=1$, $G_y=1$), due to the symmetry of the wave profile, setting the left hand side of the Equation 7 to I/2, setting $\theta_y$ to zero, substituting for $\theta_x$ the value of $\theta_{fwhm}/2$, and then solving for $\alpha_x$ gives Equation 8.

$$\alpha_x = \frac{\theta_{fwhm}}{\sqrt{2\ln(2)}}, \quad \text{Equation 8}$$

or $$\alpha_x = (0.8493218)\theta_{fwhm}$$

In this case, the light-emitting source with a $\theta_{fwhm}$ in the x direction of 11.7741°, the value for $\alpha_x$ would be 10.0°. A similar conversion applies in they direction.

An astigmatism term is defined. This value must be positive, and represents the distance along the local Z-axis from which the XZ distribution is defined. At the local XY plane at Z=0, the resulting ray pattern is a line oriented along the local X-axis. The LED source is symmetrically located in the x and y directions about the local coordinate origin.

The parameters used in ZEMAX to define the light source of the embodiment were:
1. Analysis Rays=5,000,000
2. Power (Watts)=9
3. X-Divergence=10.0
4. X-Super Gauss (Gx)=1.0
5. Y-Divergence=10.0
6. X-Super Gauss ($G_y$)=1.0

For the light source, the value of Gx=1 and $G_y$=1 were chosen so that the light ray emission is in the form of super Gaussian profile in both XZ and YZ plane. (See FIGS. 13A and 13B).

The cone-optic light pipe model was generated using CAD software Pro Engineer with detailed dimension geometry, and the solid model was then converted into a ZEMAX object input file in a geographic information system format, i.e. a GIS file.

The detector is modelled as a rectangular shape; the detector surface is designed to be normal to the direction with the cone optic light pipe body center. For detecting far-field effect light rays, the detector is placed at a distance from the cone tip equal to 40 times the height of the cone optic light pipe body.

Results of ZEMAX Non-Sequential Ray-Tracing Simulation

Figure 11:
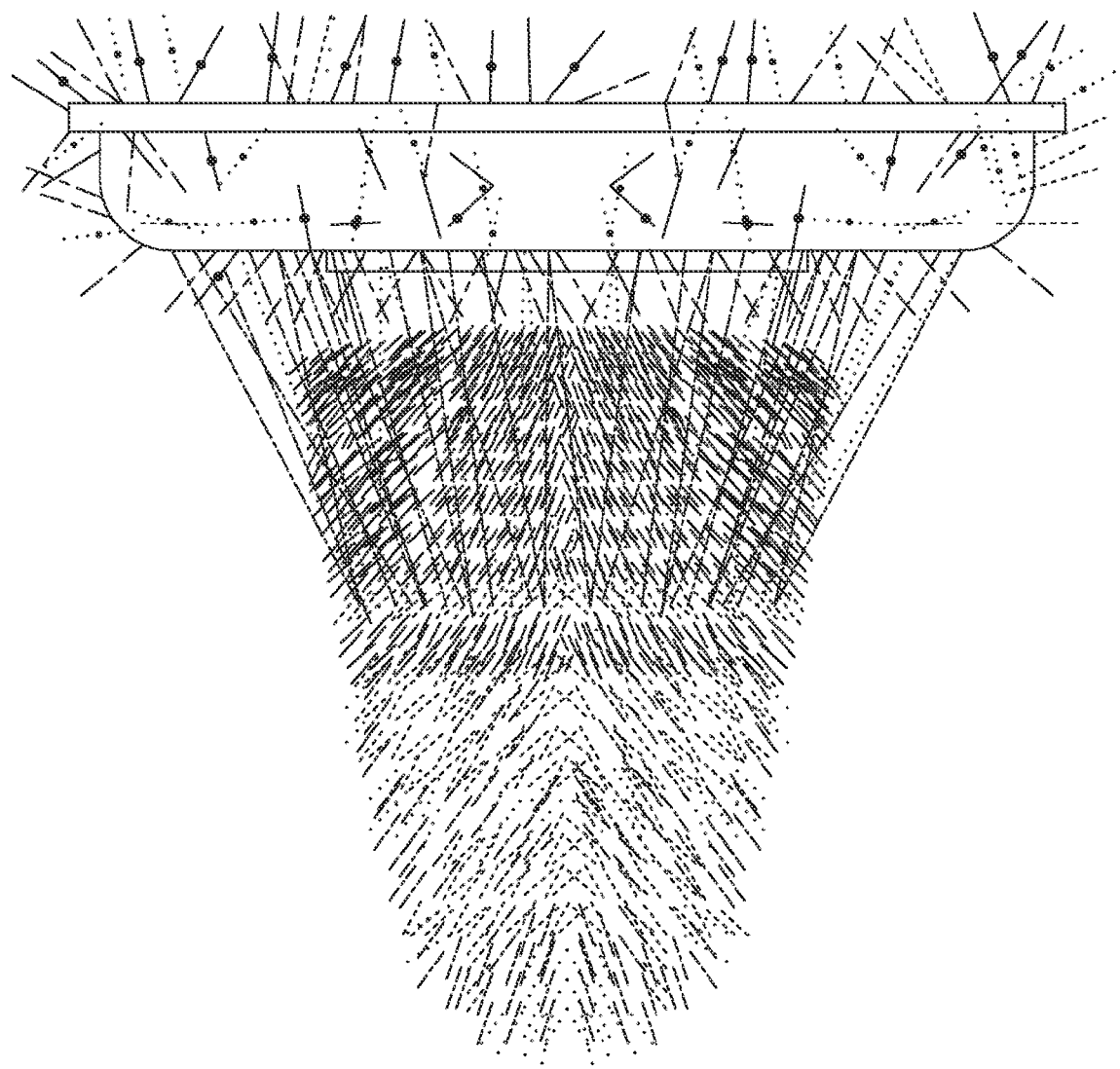
FIG. 11 shows a simplified schematic black and white representation of the results of a computational simulation showing near-field ray-tracings, for an optical system as shown in FIG. 8.
Figure 12B:
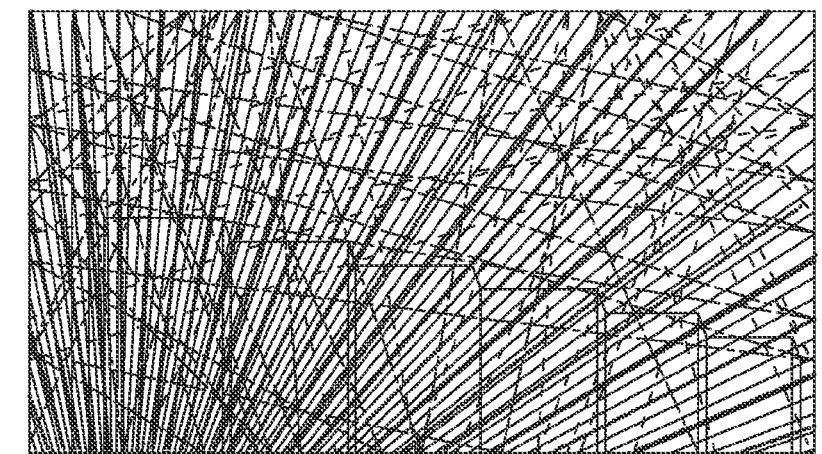
FIG. 12B shows an enlarged view of part of FIG. 12A.
Figure 12A:
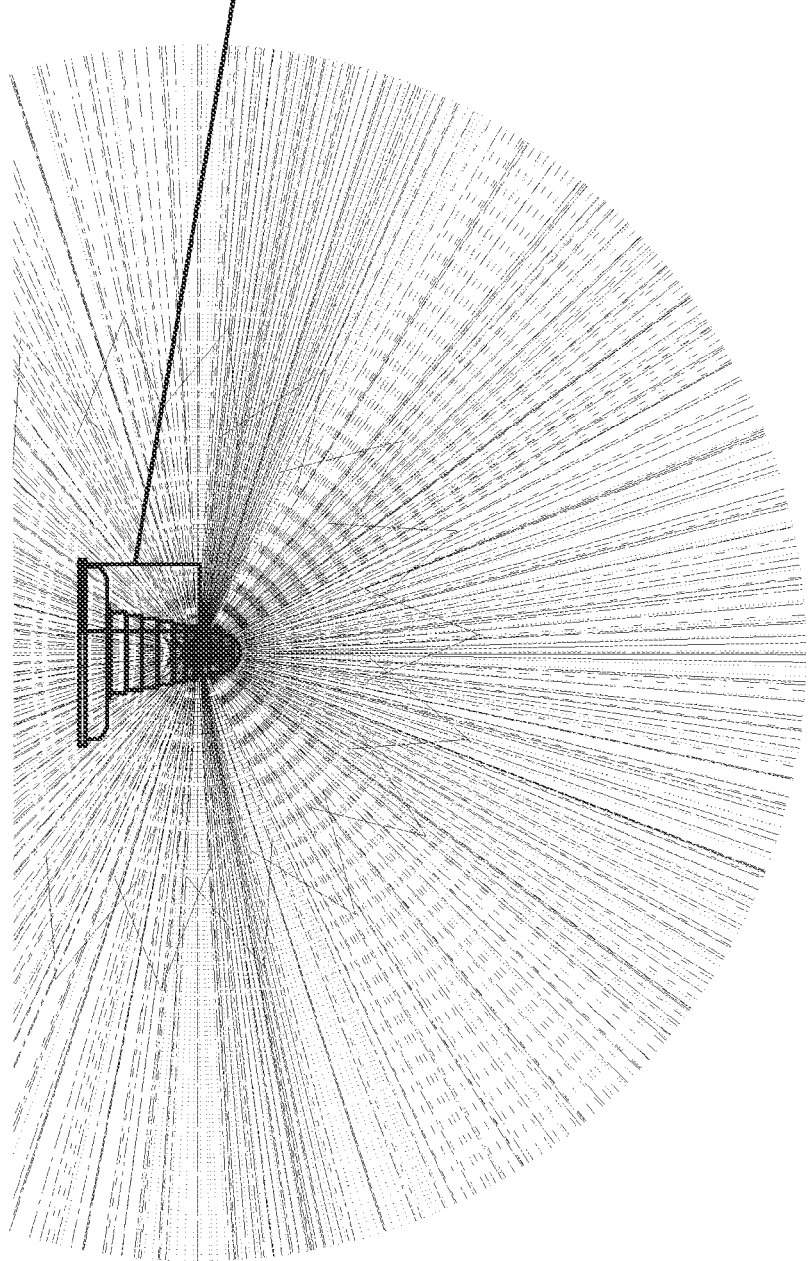
FIG. 12A shows a simplified schematic black and white representation of results of a computational simulation showing far-field ray-tracings, for an optical system as shown in FIG. 8.

The computational simulation results show that the cone optic light pipe model provides a strong far-field light distribution, with a light transmission efficiency greater than 90%. Light rays from the light source are reshaped from the input light distribution shown in FIGS. 13A and 13B to provide a wider angle light distribution pattern as viewed from both near-field (FIG. 11) and far-field (FIGS. 12A and 12B). FIG. 11 shows a greatly simplified schematic black and white representation of the results of a computational simulation showing near-field ray-tracings, for an optical system as shown in FIG. 8. FIG. 12A shows a greatly simplified schematic black and white representation of results of the computational simulation showing far-field ray-tracings. FIG. 12B shows an enlarged view of part of FIG. 12A. FIGS. 11, 12A and 12B were generated as schematic black and white representations of the corresponding coloured ray tracing diagrams of FIGS. 11 and 12 in the U.S. provisional application from which this application claims priority, which are incorporated herein by reference. The reader is directed to those coloured figures for a more representative schematic view of the near-field and far-field ray tracings.

The light distribution is also shown in in FIG. 14, for the "Light pipe created" distribution (dashed line). Thus, the output angular distribution light rays transmitted out from the cone optic light pipe is significantly widened, i.e. over an angular distribution of greater than 140° relative to the input light distribution of the LED light source.

Experimental Measurements

Figure 15:
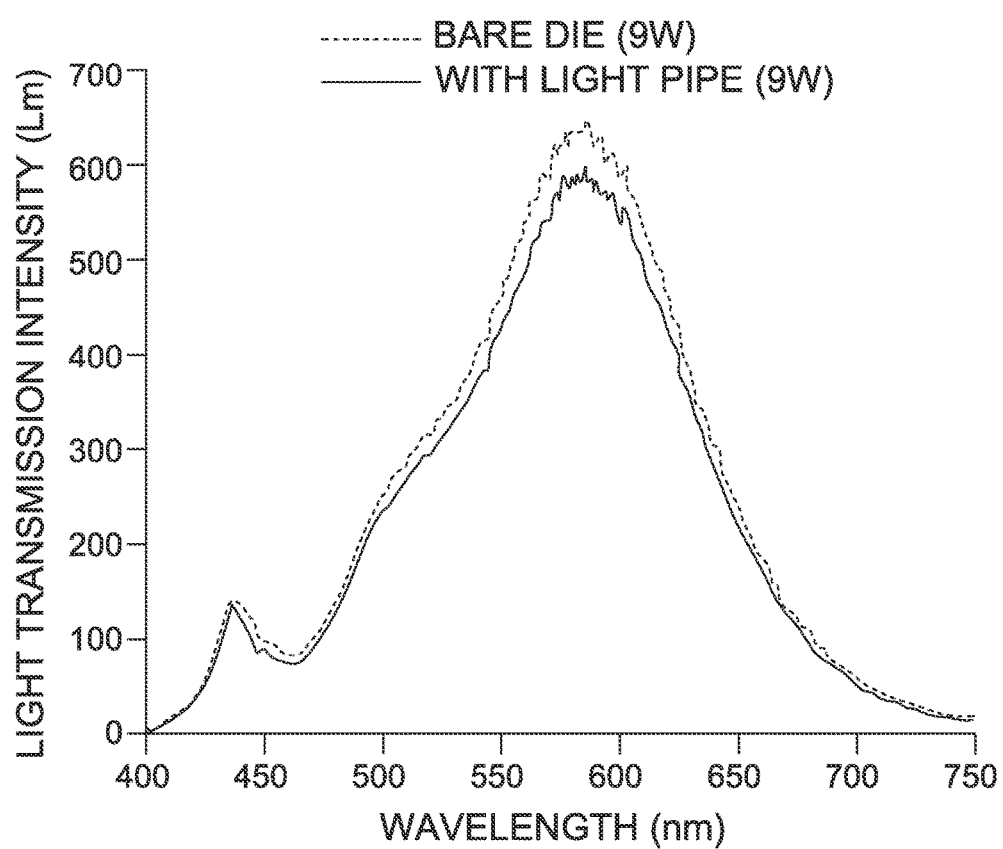
FIG. 15 compares plots of the light transmission intensity vs. wavelength for light emission from a bare LED die without the cone-optic light pipe (dashed-line), and light emission from the same LED through the cone-optic light pipe (solid-line)
Figure 16:
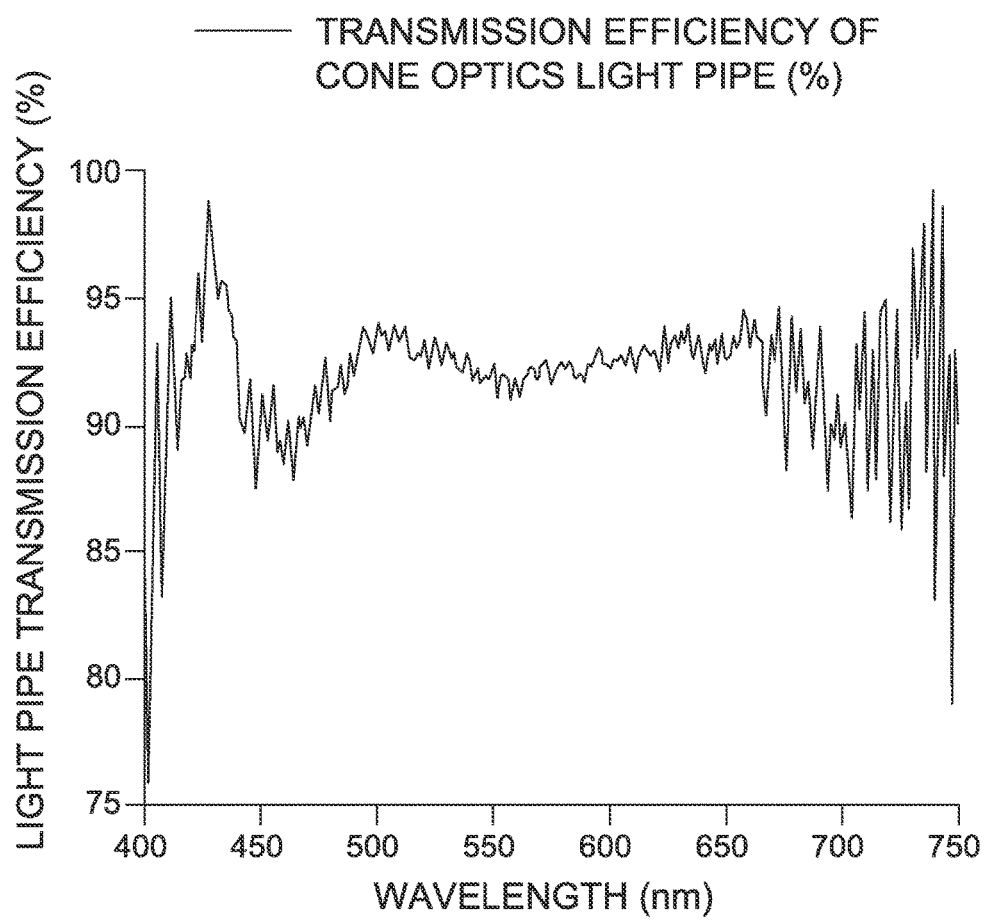
FIG. 16 shows another plot of the data illustrated in FIG. 15, showing transmission efficiency (%) of the cone-optic light pipe over the wavelength range from 400 nm to 750 nm, demonstrating light transmission efficiency greater than 90% across the visible wavelength band.

FIGS. 14, 15 and 16 show experimental results from measurements using a prototype light guide comprising a light guide according to the embodiment illustrated schematically in FIG. 8.

In this particular example, to first order, the design criteria explained above were satisfied for an inner cone angle of 28.7° and an outer cone angle of 35.5°, respectively. Each of the inner and outer cone surfaces further comprise a plurality of facets defining a grating structure as illustrated, which provide for further reshaping of the output light distribution.

The measured results demonstrate consistency with the computational simulation for the light distribution vs. angle and provide proof of concept for the design of the cone-optic light pipe that can distribute an LED light source radiation pattern over a wide angular distribution, i.e. exceeding 140° (FIG. 14-distribution B), to simulate the light distribution of a conventional incandescent bulb (FIG. 14-distribution A).

These results demonstrate the feasibility of integrating a chip comprising a single high brightness LED light source with a more readily manufactured light guide to create a solid-state lighting system, or "light engine" for SSL applications. In particular, the cone optic light guide provides for an optical system, using a suitable, commercially available white light LED light source, without requiring a hemispherical dome lens, and producing an omni-directional light distribution, over a sufficiently wide angular distribution, to be suitable for replacement of conventional incandescent light sources.

FIG. 15 shows plots comparing the luminous intensity transmission efficiency of an LED die, coupled to the light pipe, relative to the same bare LED light source without the light pipe. As illustrated in FIG. 16, showing another representation of these results, the average light transmission efficiency is greater than 90% across the visible wavelength range emitted by the LED light source.

Figure 18:
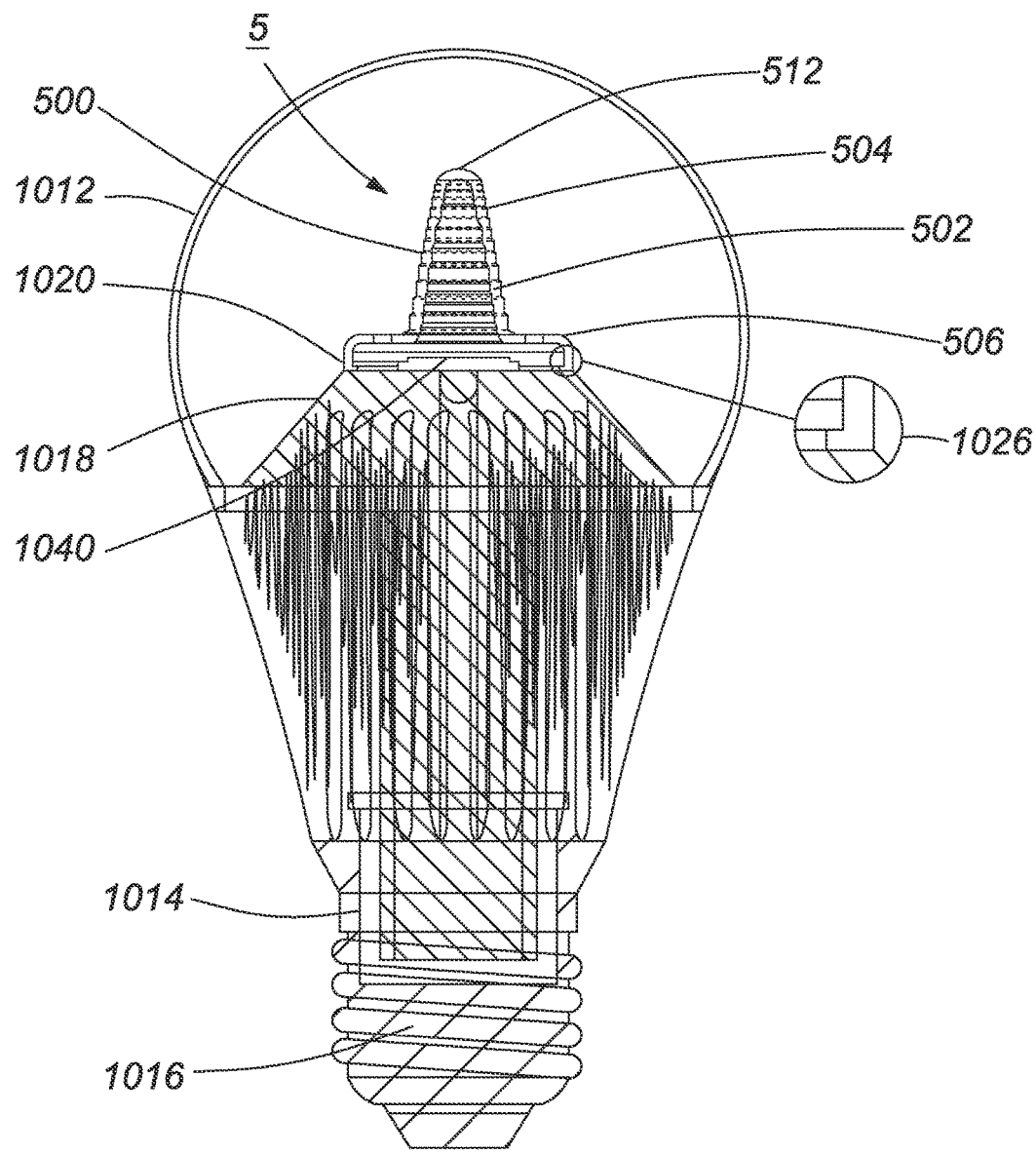
FIG. 18 shows schematically a system for solid-state lighting comprising an assembly of a solid-state light-emitting device (LED) and a light guide according to another embodiment of the present invention, taking the form of a light bulb.
Figure 19:
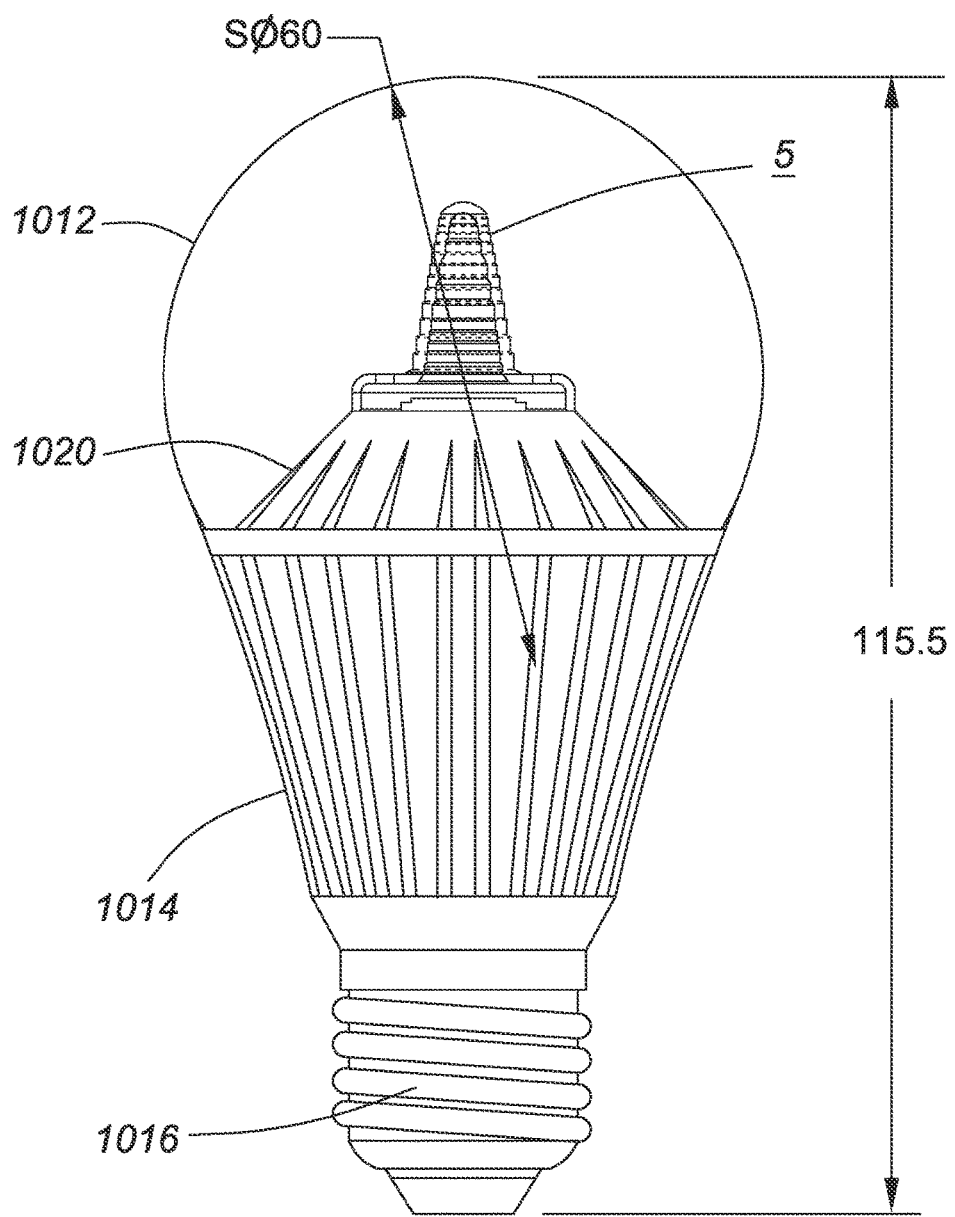
FIG. 19 shows an external side view of the system shown in FIG. 18.

FIG. 18 shows a cross-sectional view of another system 1000 in the form of a light bulb comprising a light guide 5 of yet another embodiment. The light guide 5 has a body 500 comprising an inner cone surface 502 and an outer cone surface 504, each comprising a grating structure, similar to those of light guide 4. Light guide 5 differs in that the base 506 allows for clipon attachment (see clip 1026 in inset detail B) to a mounting surface 1020 of a pedestal 1018 of the base 1014, on which the LED light source 1040 is mounted. A thin plastic transparent globe 1012 is attached to the base 1014 (see attachment 1028 shown in inset, detail A). The bulb 1000 is shown with a standard screw fitting base 1016. In this embodiment, which has a plastic rather than glass globe 1012, and a tapered pedestal 1018, the LED light source 1040 is positioned near the centre of the globe and the apex 512 of the body 500 of the lightguide 5 is positioned closer to the top of the globe. FIG. 19 shows an external view of the bulb shown in FIG. 18, showing dimensions of this particular example.

Mechanical and Manufacturing Considerations

Advantageously, all surfaces of the light guides of preferred embodiments of the invention, including the inner and outer cone surfaces defining the facets of the grating structure, converge or taper towards the apex of the cone, or are cylindrical surfaces parallel to the cone axis. Thus, such a structure can be molded by a one-step injection molding process, using a mold tool that can be fabricated relatively simply. To facilitate mold release, all cylindrical surfaces providing vertical spacing of the facets are also preferably tapered slightly towards the apex, i.e. by ≤1°. Thus, beneficially, a mold tool can be produced to mold a light guide with optical quality surfaces, requiring minimal, if any, subsequent polishing or finishing steps. This structure provides a manufacturing advantage over known light guide designs with multiple forward and backward facing facets that require multiple mold parts and/or multistep molding, together with subsequent optical finishing steps.

Moreover, the structure shown in FIG. 8, suitable for an A19-type bulb arrangement such as shown in FIG. 1, is compact in size, e.g. less than 20 mm in overall height, with a 25.4 mm diameter base. The inner air cavity means that the conical body requires less material and is lightweight, i.e. less than 2 g, and perhaps about 1.2 g for the light guide of the embodiment described above, when fabricated with optical-grade PMMA. This is about one third or one quarter of the weight of other known designs of light guides for A19-type light bulb applications. The conical shape also has good mechanical strength. The air-filled, inner cone cavity, combined with the ventilation apertures, enables air flow (convection) to help reduce local build-up of heat in the light guide, and potentially assists in reducing thermally induced degradation during long term operation. In preferred embodiments, either those with single facet conical inner and outer surfaces, or those with a more complex inner and outer cone surface comprising multiple facets defining inner and outer grating structures, the body of the optical device comprises a relatively thin, lightweight body, of substantially uniform thickness, e.g. ~1 mm. This structure facilitates fabrication by injection molding, and also reduces heat stresses, both in manufacturing and operation. In comparison, prior art, solid core light guides, which are in close contact with an LED light source may be subject to a much larger temperature gradient, between the distal tip of the light guide and a hot spot at the proximal end that is in close contact with the LED source, which may exceed 100° C.

Optical Coatings and Surface Treatments

For some applications, surfaces of the cone optic light guide may optionally be provided with an optical coating to modify the optical properties of the air/cone body interface(s). The coating may for example, comprise a thin film coating for modifying the reflectivity, i.e. an anti-reflection coating, or a dichroic coating for color filtering or adjustment. The coating may be provided on all inner and outer cone surfaces and facets, or may be provided selectively on some of the surfaces or facets.

For some applications, surfaces of the facets 420, 421, 422 and 424 forming the grating structure 426 and 428 may themselves each comprise multiple facets, i.e. sub-facets. Alternatively, the facets 420, 421, 422 and 424 may comprise surface texturing, structuring, patterning or frosting, or be provided with another type of surface treatment to modify the optical properties. Such surface treatments may be provided selectively on some or all cone surfaces 402 and 404 and facets 420, 421, 422 and 424 to further assist in distributing light over a wide angular distribution. Alternatively, such surface treatments may be provided for diffusing or structuring the emitted light for functional or decorative purposes.

However, for lower cost manufacturing, a cone optic configuration which can be manufactured in a simple one-step injection molding process, without additional process or treatment steps, may be preferred.

Cone optic light guides of different configurations can be tailored for use with different LED light sources, i.e. adapted to different input light distributions by adjusting the dimensions and cone angles as described above.

ALTERNATIVE EMBODIMENTS

Optical devices in the form of a cone optic light guide, according to embodiments described in detail above, are provided by way of example only. These cone optic light guides were based on specific design parameters for coupling to a particular LED light source, i.e. one providing a particular super-Gaussian output distribution over a circular area. It will be appreciated that modifications may be made to the embodiments for optical coupling to other solid-state light-emitting devices. The specific configuration of the light guide is dependent on the geometry and light distribution of the solid-state light and is tailored to the specific light source. The major parameters to be varied are the inner cone cavity opening diameter d and the cone geometry height of both the inner and outer cone surfaces (h, H, respectively), which define the inner and outer cone angles $\Phi$ and $\Theta$, respectively. The conic angles, $\theta_{inner}$, $\phi_{inner}$, of the facets of inner grating and conic angles $\theta_{outer}$, $\phi_{outer}$ of facets of the outer grating are second-order parameters, which further shape the angular light distribution.

In the above described embodiments, the cone optic is based on a cone body defined by inner and outer surfaces 402 and 404 comprising concentric cone surfaces that converge to a rounded cone tip or apex 412. Thus, as illustrated, the conical surfaces forming facets 420, 421, 422 and 424 of the grating structures 426 and 428, e.g. shown in FIG. 6, can be described as frusto-conical surfaces of a right circular cone (i.e. a cone having circular base, in which the axis of the cone is at right angles to the base, and the top of the cone is cut off). As shown in FIG. 6, the grating structures 426 and 428 comprise alternating conical and cylindrical facets 420/422 and 421/424. In alternative embodiments, the inner and outer cylindrical or spacing facets 421 and 424, respectively, may instead of having vertical surfaces parallel to the longitudinal Z-axis of the cone, comprise slightly angled surfaces tapering inwards towards the apex or axis 410, i.e. substantially cylindrical or vertical inner and outer facets 421 and 424 tapered 1° or less towards the apex, to facilitate mold release. In some embodiments, all spacing facets 421 and 424 may be conical.

In other alternative embodiments, different numbers and arrangements of facets 420, 421, 422 and 424 may be provided to form a grating structure 426 and 428 on one or both of the inner and outer cone surfaces 402 and 404 of the cone body 400. The dimensions and cone angles are selected as required to provide a desired or predetermined angular distribution of light based on the specific emission pattern of the LED light source 440 for which the cone optic device is designed.

As described above, the light guide is preferably molded from optical glass or an optical polymer such as PMMA having a refractive index $n_1 \geq 1.4$. The light guide is typically used in an air or gas environment, having a refractive index $n_2$ of about 1, and the inner cone cavity comprises an optical medium which is the same as the surrounding air/gas ambient. In some embodiments, the cone cavity may be filled with another optical medium, of refractive index $n_2$, lower than refractive index $n_1$.

While a cone structure 400 with a circular base is preferred for matching to an LED light source 440 with a circular emitter area 444, in other alternative embodiments, the optical element may comprise cone surfaces that, for example, comprise near circular shapes, e.g. elliptical cone surfaces (i.e. having an elliptical base and a cone axis at a right angle to the LED emitter surface). A cone optic having a base with a circular cross-section in the XY plane is preferred to provide a uniform light distribution which is rotationally symmetric about the Z-axis of the cone. It is contemplated that other pseudo-circular shapes could be used for the base, such a many sided, polygonal shape, which approximates a circle. However, a rectangular, triangular or square base is not contemplated to be a practical solution for applications requiring a light distribution approximating that of an incandescent light source, since it is desirable to avoid edges where surfaces of the optic meet at acute angles, which would cause discontinuities or noticeable artefacts in the uniformity of the light distribution around the Z-axis.

Thus, while specific embodiments of the method are described above, it will be appreciated that other embodiments of the cone optic light pipe may be made within the design constraints and guidelines described above, with one or both of the inner and outer cone surfaces provided with a plurality of facets, which form a grating structure.

In comparing the effectiveness of prototypes of the light guides illustrated schematically in FIGS. 2, 3 and 4, for example, each light guide produces a different light distribution from the same LED light source as illustrated by a set of experimental results shown in FIGS. 17A, 17B and 17C. As shown in FIG. 17A, the conical light guide 200 shown in FIG. 2, with simple coaxial inner and outer cone surfaces 202 and 204, produces a light distribution over a wider angle and with reduced intensity along the Z-axis direction compared to the LED light source distribution. As shown in FIG. 17C, the cone optic light guide 400 with a grating structure on each of the inner and outer cone surfaces of the light guide of FIG. 4 produces a light distribution over a significantly wider angle. As described above, this type of omni-directional light distribution has a sufficiently wide angular distribution to be suitable for a standard format A19-type globe light bulb. As shown in FIG. 17B, the light guide 300, as illustrated in FIG. 3, provides yet another different light distribution, narrower than that of FIG. 17C, but with more intensity along the Z-axis direction compared to FIG. 17A. While the narrower distributions shown in FIGS. 17A and 17B may not be suitable for an A19-type bulb, they may have application, for example, for an incandescent candelabra bulb replacement. It will be appreciated from these test measurements that adjustment of the geometric parameters of the cone optic light pipe, as explained above in detail, and based on a particular input light distribution and geometry of the LED light source, can control the output light distribution to provide an omni-directional light distribution over a desired or predetermined angular distribution. Adjustment of these parameters can also provide for a more even or uniform light distribution over a wide angle.

As described above, light guides according to embodiments of the invention, and modifications of those embodiments, may comprise one or more of the following features:

Compact design: a smaller size, i.e. diameter and height, provides flexibility for integrating the light pipe into a lighting device of smaller dimensions.

The conical design with an air core/inner cavity requires very little material for manufacture and thus, is relatively light weight compared with solid light pipes.

A lightweight light pipe eases requirements for integrated device packaging, for example, requiring less mechanical force for retaining the device, e.g. by adhesive or other means.

Apertures for air flow assist in thermal management: the air-filled hollow inner core above the hot LED light source is connected by the apertures to the ambient environment to allow for heat to escape.

Ease of manufacture: the arrangement and orientation of the surfaces of the conical structure, comprising concentric, coaxial conical surfaces, are designed for ease of molding, e.g. allows for a single-step injection molding process, without requiring additional optical finishing steps, resulting in cost savings relative to more complex structures.

A cone optics light guide and a system comprising an assembly of a cone optics light guide with a solid-state light emitter such as an LED array, provides for improved control of the directional distribution of light for applications such as solid-state lighting (SSL). In particular, an SSL source comprising a cone optic light pipe, according to an embodiment of the invention, provides an omni-directional light distribution that is comparable to that of a conventional incandescent light bulb, such as an A19-type bulb. It provides efficient transmission of light (>90%) across the visible spectral region and provides an angular distribution over an angular distribution of >140° relative to a planar emitting surface of the LED. The cone optics light guide is compact, which allows for integration into smaller lighting devices. It preferably provides apertures for air flow to assist in thermal dissipation. The geometric structure enables it to be readily manufactured by a one-step injection molding process from optical-grade polymers such as PMMA without requiring additional optical finishing of the surfaces. It is light weight, and requires only a few grams of material. Thus, the geometric optics of the cone optics light guide provide for a wide angle omni-directional light distribution with high transmission efficiency and its construction also addresses issues of thermal engineering and manufacturing technology.

Although embodiments of the invention have been described and illustrated in detail, it is to be clearly understood that the same is by way of illustration and example only, and not to be taken by way of limitation, the scope of the present invention being limited only by the appended claims.

The invention claimed is:

1. An optical device for transforming an input light distribution from a solid-state light-emitting device (LED) light source to provide an omni-directional output light distribution, the optical device comprising:
   a conical body of an optically-transparent material comprising an inner cone surface and an outer cone surface surrounding a longitudinal axis;
   the inner and outer cone surfaces converging coaxially from a base of the conical body to a convexly rounded tip at an apex of the conical body for transmitting light upwardly therethrough, and defining an outer cone of the optically-transparent material, having a first refractive index $n_1$, and an inner cone comprising a cavity containing a transparent optical medium of a second refractive index $n_2$, wherein $n_1 > n_2$;
   the inner cone having a diameter (d) at the base of the conical body for coupling to a light-emitting surface of the LED light source and receiving therefrom a predetermined input light distribution;
   the inner cone surface comprising an inner grating structure comprising a first plurality of conical facets, and a first plurality of cylindrical spacing facets parallel to the longitudinal axis;
   the outer cone surface comprising an outer grating structure comprising a second plurality of conical facets, and a second plurality of cylindrical spacing facets parallel to the longitudinal axis;
   said first and second plurality of conical facets extending upwardly from the first and second cylindrical spacing facets, respectively, and tapering inwardly towards the apex of the conical body, and cone angles of the first and second plurality of conical facets being configured to reshape the predetermined input light distribution from the LED light source and generate an omni-directional output light distribution.

2. The optical device of claim 1, wherein the inner and outer cone surfaces extend respectively to the convexly a rounded tip of inner radius r and outer radius R at the apex of the cone body, and at the apex of the cone body, the inner and outer cone surfaces have an inner height h and an outer height H, respectively; said parameters h and H, and r and R, and said cone angles of the first and second plurality of conical facets defining an optical transform function for generating the omni-directional output light distribution from said predetermined input light distribution.

3. The optical device of claim 2, wherein cone angles of each of the plurality of conical facets of the inner grating structure are defined by inner angles $\theta_{inner}$ and $\phi_{inner}$, and cone angles of each of the plurality of conical facets of the outer grating structure are defined by outer angles $\theta_{outer}$ and $\phi_{outer}$.

4. The optical device of claim 1, wherein the inner and outer surfaces are defined respectively by an inner cone angle $\phi$ between diametrically opposed points on the inner cone surface, and an outer cone angle $\Theta$ between diametrically opposed points on the outer cone surface, each of $\phi$ and $\Theta$ being less than 90°.

5. The optical device of claim 1, wherein each of the inner grating structure and the outer grating structure comprises a series of said plurality of conical facets and alternating cylindrical spacing facets, diminishing in diameter towards the apex of the conical body.

6. The optical device of claim 1, wherein the respective cone angles and spacings of the first and second plurality of conical facets vary along a respective length of each of the inner and outer grating structures.

7. The optical device of claim 1, wherein the cone angles and spacings of the first plurality of conical facets defining the inner grating structure are different from the cone angles and spacings of the second plurality of conical facets defining the outer grating structure.

8. The optical device of claim 1, wherein said first and second plurality of conical facets of the respective inner and outer grating structures each comprise one or more groups of conical facets, each group comprising a set of concentric annular conical facets similar in at least one of cone angle and size, and diminishing in diameter towards the apex, each group being different, in at least one of size and cone angle of the conical facets, from other groups.

9. The optical device of claim 1, wherein said first and second plurality of spacing facets each comprise a plurality of groups of spacing facets, wherein each group of spacing facets vary in height from group to group.

10. The optical device of claim 1, wherein the inner cone comprises an air or gas filled cavity; wherein the second refractive index $n_2$ is approximately 1.

11. The optical device of claim 10, wherein the optically-transparent material comprises glass or PMMA having a refractive index between 1.49 and 1.57.

12. The optical device of claim 1, wherein at the base of the conical body, the inner and outer cone surfaces extend radially outwards to form a base region of the optical device for mounting to a substrate of the LED light source and wherein the base region comprises a plurality of ventilation apertures for the cavity.

13. The optical device of claim 12, wherein the base region comprises a flange extending around the base of the cone body, said flange providing a support surface for mounting to the substrate of the LED light source, and wherein the plurality of ventilation apertures are arranged around the flange.

14. The optical device of claim 1, for generating, from an LED light source having a substantially flat light-emitting surface, a light distribution over a solid angle greater than one hemisphere.

15. The optical device of claim 1, wherein the inner and outer cone surfaces and the first and second plurality of conical facets of the conical body taper inwardly towards the apex, for fabrication by a process comprising one-step injection molding from said optically-transparent material.

16. The optical device of claim 1, having transmission efficiency of about 85% over the visible spectral range.

17. A solid-state lighting (SSL) system comprising an assembly of the solid-state light-emitting device (LED) light source and the optical device as defined in claim 1, wherein: the solid-state light-emitting device comprises a substrate having a substantially planar light-emitting surface, and wherein the inner cone of the optical device is aligned over the light-emitting surface to collect light emitted therefrom for transforming an input light distribution from the solid-state light-emitting device (LED) to provide an omni-directional output light distribution.

18. The system of claim 17, wherein the light-emitting surface comprises a substantially planar light-emitting surface of a diameter d, and wherein the diameter of the inner cone at the cone base matches the diameter d of the light-emitting surface.

* * * * *